United States Patent
Pacala et al.

(10) Patent No.: US 11,190,750 B2
(45) Date of Patent: *Nov. 30, 2021

(54) OPTICAL IMAGING SYSTEM WITH A PLURALITY OF SENSE CHANNELS

(71) Applicant: Ouster, Inc., San Francisco, CA (US)

(72) Inventors: Angus Pacala, San Francisco, CA (US); Mark Frichtl, San Francisco, CA (US)

(73) Assignee: Ouster, Inc., San Francisco, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 16/046,643

(22) Filed: Jul. 26, 2018

(65) Prior Publication Data

US 2018/0359460 A1 Dec. 13, 2018

Related U.S. Application Data

(63) Continuation of application No. 15/880,491, filed on Jan. 25, 2018, now Pat. No. 11,025,885, which is a
(Continued)

(51) Int. Cl.
*H04N 13/218* (2018.01)
*G02B 5/20* (2006.01)
(Continued)

(52) U.S. Cl.
CPC ......... *H04N 13/218* (2018.05); *G02B 3/0056* (2013.01); *G02B 5/005* (2013.01);
(Continued)

(58) Field of Classification Search
CPC .......... H04N 13/0217; H04N 13/0207; H04N 13/0203; H04N 13/0495; H04N 13/0488;
(Continued)

(56) References Cited

U.S. PATENT DOCUMENTS

| | | | |
|---|---|---|---|
| 4,358,851 A | 11/1982 | Scifres et al. | |
| 4,634,272 A | 1/1987 | Endo | |

(Continued)

FOREIGN PATENT DOCUMENTS

| | | |
|---|---|---|
| AU | 2017212835 | 6/2019 |
| AU | 2017330180 | 10/2019 |

(Continued)

OTHER PUBLICATIONS

U.S. Appl. No. 15/419,053, "Corrected Notice of Allowability", dated Mar. 12, 2018, 8 pages.
(Continued)

*Primary Examiner* — John R Lee
(74) *Attorney, Agent, or Firm* — Kilpatrick Townsend & Stockton LLP

(57) ABSTRACT

An optical system for collecting distance information within a field is provided. The optical system may include lenses for collecting photons from a field and may include lenses for distributing photons to a field. The optical system may include lenses that collimate photons passed by an aperture, optical filters that reject normally incident light outside of the operating wavelength, and pixels that detect incident photons. The optical system may further include illumination sources that output photons at an operating wavelength.

50 Claims, 8 Drawing Sheets

Related U.S. Application Data continuation of application No. 15/276,532, filed on Sep. 26, 2016, now Pat. No. 9,992,477.

(60) Provisional application No. 62/232,222, filed on Sep. 24, 2015.

(51) Int. Cl.
    *G02B 27/46*     (2006.01)
    *G02B 3/00*     (2006.01)
    *G02B 5/00*     (2006.01)
    *G02B 30/27*     (2020.01)

(52) U.S. Cl.
    CPC .............. *G02B 5/208* (2013.01); *G02B 27/46* (2013.01); *G02B 30/27* (2020.01)

(58) Field of Classification Search
    CPC .. H04N 13/218; G02B 3/0056; G02B 3/0037; G02B 3/0006; G02B 5/005; G02B 5/208; G02B 5/20; G02B 27/2214; G02B 27/22; G02B 6/002; G02B 30/27; G02B 27/46; G01J 1/08; G01J 1/02; G01J 1/0266; G01J 1/029
    See application file for complete search history.

(56) References Cited

U.S. PATENT DOCUMENTS

| | | |
|---|---|---|
| 4,676,599 A | 6/1987 | Cruz |
| 4,702,600 A | 10/1987 | Handrich et al. |
| 4,744,667 A | 5/1988 | Fay et al. |
| 4,851,664 A | 7/1989 | Rieger |
| 5,188,286 A | 2/1993 | Pence, IV |
| 5,267,016 A | 11/1993 | Meinzer et al. |
| 5,268,748 A | 12/1993 | Van Hijningen et al. |
| 5,288,992 A | 2/1994 | Fohl |
| 5,659,420 A | 8/1997 | Wakai et al. |
| 5,953,110 A | 9/1999 | Burns |
| 5,982,552 A | 11/1999 | Nakama et al. |
| 6,014,232 A | 1/2000 | Clarke |
| 6,028,306 A | 2/2000 | Hayashi |
| 6,043,873 A | 3/2000 | Ramer et al. |
| 6,104,516 A | 8/2000 | Majima |
| 6,133,989 A | 10/2000 | Stettner et al. |
| 6,255,133 B1 | 7/2001 | Ormond |
| 6,374,024 B1 | 4/2002 | Iijima |
| 6,414,746 B1 | 7/2002 | Stettner et al. |
| 6,690,019 B2 | 2/2004 | Stettner et al. |
| 6,721,262 B1 | 4/2004 | Jordache et al. |
| 7,091,462 B2 | 8/2006 | Wilson et al. |
| D531,525 S | 11/2006 | Dold et al. |
| 7,170,542 B2 | 1/2007 | Hanina et al. |
| 7,295,298 B2 | 11/2007 | Willhoeft et al. |
| 7,345,271 B2 | 3/2008 | Boehlau et al. |
| 7,421,159 B2 | 9/2008 | Yang et al. |
| 7,433,042 B1 | 10/2008 | Cavanaugh |
| 7,683,962 B2 | 3/2010 | Border et al. |
| 7,808,706 B2 | 10/2010 | Fadel et al. |
| 7,873,601 B1 | 1/2011 | Kushwah |
| 7,876,456 B2 | 1/2011 | Sesko |
| 7,969,558 B2 | 6/2011 | Hall |
| 8,013,983 B2 | 9/2011 | Lin et al. |
| 8,130,367 B2 | 3/2012 | Stettner et al. |
| D659,030 S | 5/2012 | Anselment et al. |
| 8,319,949 B2 | 11/2012 | Cantin et al. |
| 8,089,618 B2 | 12/2012 | Yang |
| 8,330,840 B2 | 12/2012 | Lenchenkov |
| 8,374,405 B2 | 2/2013 | Lee et al. |
| 8,384,997 B2 | 2/2013 | Shpunt et al. |
| 8,494,252 B2 | 7/2013 | Freedman et al. |
| 8,504,529 B1 | 8/2013 | Zheng et al. |
| 8,645,810 B2 | 2/2014 | Sharon et al. |
| 8,675,181 B2 | 3/2014 | Hall |
| 8,717,488 B2 | 5/2014 | Shpunt et al. |
| 8,742,325 B1 | 6/2014 | Droz et al. |
| 8,743,176 B2 | 6/2014 | Stettner et al. |
| 8,761,495 B2 | 6/2014 | Freedman et al. |
| 8,762,798 B2 | 6/2014 | Hu et al. |
| 8,767,190 B2 | 7/2014 | Hall |
| 8,829,406 B2 | 9/2014 | Akerman et al. |
| 8,836,922 B1 | 9/2014 | Pennecot et al. |
| 8,848,039 B2 | 9/2014 | Spektor et al. |
| 9,041,915 B2 | 5/2015 | Earnhart et al. |
| 9,063,549 B1 | 6/2015 | Pennecot et al. |
| 9,071,763 B1 | 6/2015 | Templeton et al. |
| 9,086,273 B1 | 7/2015 | Gruver et al. |
| 9,111,444 B2 | 8/2015 | Kaganovich |
| 9,157,790 B2 | 10/2015 | Shpunt et al. |
| 9,164,511 B1 | 10/2015 | Ferguson et al. |
| 9,176,051 B2 | 11/2015 | Mappes et al. |
| 9,229,109 B2 | 1/2016 | Stettner et al. |
| 9,281,841 B2 | 3/2016 | Chen et al. |
| 9,285,464 B2 | 3/2016 | Pennecot et al. |
| 9,299,731 B1 | 3/2016 | Lenius et al. |
| 9,330,464 B1 | 5/2016 | Ackerman et al. |
| 9,368,936 B1 | 6/2016 | Lenius et al. |
| 9,369,689 B1 | 6/2016 | Tran et al. |
| 9,285,477 B1 | 7/2016 | Smith et al. |
| 9,383,753 B1 | 7/2016 | Templeton et al. |
| 9,425,654 B2 | 8/2016 | Lenius et al. |
| 9,435,891 B2 | 9/2016 | Oggier |
| 9,470,520 B2 | 10/2016 | Schwarz et al. |
| 9,489,601 B2 | 11/2016 | Fairfield et al. |
| 9,525,863 B2 | 12/2016 | Nawasra et al. |
| 9,529,079 B1 | 12/2016 | Droz et al. |
| 9,551,791 B2 | 1/2017 | Van Den Bossche et al. |
| 9,866,241 B2 | 1/2018 | Yen et al. |
| 9,989,406 B2 | 6/2018 | Pacala et al. |
| 9,992,477 B2 | 6/2018 | Pacala et al. |
| 10,063,849 B2 | 8/2018 | Pacala et al. |
| 10,183,541 B2 | 1/2019 | Van Den Bossche et al. |
| 10,222,475 B2 * | 3/2019 | Pacala ............... H01L 31/02027 |
| 10,291,261 B2 | 5/2019 | Yen et al. |
| 10,557,750 B2 | 2/2020 | Pacala et al. |
| 10,663,586 B2 * | 5/2020 | Pacala ............... H01L 31/02027 |
| 10,739,189 B2 * | 8/2020 | Pacala ................... G01S 17/894 |
| 10,760,957 B2 * | 9/2020 | Pacala ................... G01J 3/0208 |
| 10,809,359 B2 | 10/2020 | Pacala et al. |
| 10,809,380 B2 | 10/2020 | Pacala |
| 11,025,885 B2 | 6/2021 | Pacala et al. |
| 11,086,013 B2 * | 8/2021 | Pacala ................... G01S 7/4865 |
| 2002/0003617 A1 | 1/2002 | Doemens et al. |
| 2003/0006676 A1 | 1/2003 | Smith et al. |
| 2003/0047752 A1 | 3/2003 | Campbell |
| 2004/0061502 A1 | 4/2004 | Hasser |
| 2004/0223071 A1 | 11/2004 | David |
| 2005/0030409 A1 | 2/2005 | Matherson |
| 2005/0046850 A1 | 3/2005 | Chow |
| 2006/0244851 A1 | 11/2006 | Cartlidge |
| 2007/0007563 A1 | 1/2007 | Mouli |
| 2007/0057211 A1 | 3/2007 | Bahlman et al. |
| 2007/0060806 A1 | 3/2007 | Hunter et al. |
| 2007/0228262 A1 | 10/2007 | Cantin et al. |
| 2008/0037114 A1 | 2/2008 | Sheblee et al. |
| 2008/0153189 A1 | 6/2008 | Plaine |
| 2008/0218612 A1 | 9/2008 | Border et al. |
| 2009/0016642 A1 | 1/2009 | Hart |
| 2009/0040629 A1 | 2/2009 | Bechtel |
| 2009/0179142 A1 | 7/2009 | Duparre et al. |
| 2009/0236505 A1 | 9/2009 | Pallaro et al. |
| 2009/0295910 A1 | 12/2009 | Mir et al. |
| 2010/0008588 A1 | 1/2010 | Feldkhun et al. |
| 2010/0020306 A1 | 1/2010 | Hall |
| 2010/0110275 A1 | 5/2010 | Mathieu |
| 2010/0123893 A1 | 5/2010 | Yang |
| 2010/0149389 A1 | 7/2010 | Goto |
| 2010/0204964 A1 | 8/2010 | Pack et al. |
| 2010/0250700 A1 | 9/2010 | O'Brien et al. |
| 2011/0022566 A1 | 1/2011 | Beaverson et al. |
| 2011/0025843 A1 | 2/2011 | Oggier et al. |
| 2011/0032398 A1 | 2/2011 | Lenchenkov |
| 2011/0037849 A1 | 2/2011 | Niclass |
| 2011/0038459 A1 | 2/2011 | Andrews et al. |

(56) References Cited

U.S. PATENT DOCUMENTS

| | | |
|---|---|---|
| 2011/0116262 A1 | 5/2011 | Marson |
| 2011/0216304 A1 | 9/2011 | Hall |
| 2011/0228142 A1 | 9/2011 | Brueckner et al. |
| 2011/0283113 A1 | 11/2011 | Moffat et al. |
| 2011/0320865 A1 | 12/2011 | Jain et al. |
| 2012/0044476 A1 | 2/2012 | Earnhart et al. |
| 2012/0140109 A1 | 6/2012 | Shpunt et al. |
| 2012/0141104 A1 | 6/2012 | DeLuca |
| 2012/0154914 A1 | 6/2012 | MoriQuchi et al. |
| 2012/0182464 A1 | 7/2012 | Shpunt et al. |
| 2012/0287417 A1 | 11/2012 | Mimeault |
| 2012/0320164 A1 | 12/2012 | Lipton |
| 2013/0038941 A1 | 2/2013 | Pesach et al. |
| 2013/0044187 A1 | 2/2013 | Hammes et al. |
| 2013/0044310 A1 | 2/2013 | Mimeault |
| 2013/0110779 A1 | 5/2013 | Taylor et al. |
| 2013/0111262 A1 | 5/2013 | Taylor et al. |
| 2013/0141549 A1 | 6/2013 | Beers et al. |
| 2013/0206967 A1 | 8/2013 | Shpunt et al. |
| 2013/0229646 A1 | 9/2013 | Sakurai |
| 2013/0294089 A1 | 11/2013 | Freedman et al. |
| 2013/0300840 A1 | 11/2013 | Borowski |
| 2014/0006354 A1 | 1/2014 | Parkison et al. |
| 2014/0118335 A1 | 5/2014 | Gurman |
| 2014/0118493 A1 | 5/2014 | Sali et al. |
| 2014/0153001 A1 | 6/2014 | Chayat et al. |
| 2014/0158900 A1 | 6/2014 | Dae-Kun |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0267878 A1 | 9/2014 | Geelen et al. |
| 2014/0269796 A1 | 9/2014 | Geske |
| 2014/0285628 A1 | 9/2014 | Shpunt et al. |
| 2014/0291491 A1 | 10/2014 | Shpunt et al. |
| 2014/0313519 A1 | 10/2014 | Shpunt et al. |
| 2014/0375977 A1 | 12/2014 | Ludwig et al. |
| 2014/0376092 A1 | 12/2014 | Mor |
| 2015/0002636 A1 | 1/2015 | Brown et al. |
| 2015/0115131 A1 | 4/2015 | Webster et al. |
| 2015/0124094 A1 | 5/2015 | Loong et al. |
| 2015/0131080 A1 | 5/2015 | Retterath et al. |
| 2015/0184999 A1 | 7/2015 | Stettner |
| 2015/0186287 A1 | 7/2015 | Kass |
| 2015/0192677 A1 | 7/2015 | Yu et al. |
| 2015/0260830 A1 | 9/2015 | Ghosh et al. |
| 2015/0292948 A1 | 10/2015 | Goldring et al. |
| 2015/0293224 A1 | 10/2015 | Eldada et al. |
| 2015/0316473 A1 | 11/2015 | Kester et al. |
| 2015/0319349 A1 | 11/2015 | Mishra et al. |
| 2015/0355470 A1 | 12/2015 | Herschbach |
| 2015/0358601 A1 | 12/2015 | Oggier |
| 2015/0362585 A1 | 12/2015 | Ghosh et al. |
| 2015/0378241 A1 | 12/2015 | Eldada |
| 2015/0379371 A1 | 12/2015 | Yoon et al. |
| 2016/0003946 A1 | 1/2016 | Gilliland et al. |
| 2016/0047895 A1 | 2/2016 | Dussan |
| 2016/0047896 A1 | 2/2016 | Dussan |
| 2016/0047897 A1 | 2/2016 | Dussan |
| 2016/0047898 A1 | 2/2016 | Dussan |
| 2016/0047899 A1 | 2/2016 | Dussan |
| 2016/0047900 A1 | 2/2016 | Dussan |
| 2016/0047901 A1 | 2/2016 | Pacala et al. |
| 2016/0047903 A1 | 2/2016 | Dussan |
| 2016/0049765 A1 | 2/2016 | Eldada |
| 2016/0097858 A1 | 4/2016 | Mundhenk et al. |
| 2016/0150963 A1 | 6/2016 | Roukes et al. |
| 2016/0161600 A1 | 6/2016 | Eldada et al. |
| 2016/0218727 A1 | 7/2016 | Maki |
| 2016/0265902 A1 | 9/2016 | Nawasra et al. |
| 2016/0291134 A1 | 10/2016 | Droz et al. |
| 2016/0306032 A1 | 10/2016 | Schwarz et al. |
| 2016/0327779 A1 | 11/2016 | Hillman |
| 2016/0328619 A1 | 11/2016 | Yi et al. |
| 2017/0038459 A1 | 2/2017 | Kubacki et al. |
| 2017/0146640 A1 | 5/2017 | Hall et al. |
| 2017/0219426 A1 | 8/2017 | Pacala et al. |
| 2017/0219695 A1 | 8/2017 | Hall et al. |
| 2017/0269197 A1 | 9/2017 | Hall et al. |
| 2017/0269198 A1 | 9/2017 | Hall et al. |
| 2017/0269209 A1 | 9/2017 | Hall et al. |
| 2017/0269215 A1 | 9/2017 | Hall et al. |
| 2017/0289524 A1 | 10/2017 | Pacala et al. |
| 2017/0299700 A1 | 10/2017 | Pacala et al. |
| 2017/0303829 A1 | 10/2017 | Cohen et al. |
| 2017/0350983 A1 | 12/2017 | Hall et al. |
| 2018/0032396 A1 | 2/2018 | Sharon et al. |
| 2018/0038959 A1 | 2/2018 | Akatsu et al. |
| 2018/0059222 A1 | 3/2018 | Pacala et al. |
| 2018/0152691 A1 | 5/2018 | Pacala et al. |
| 2018/0167602 A1 | 6/2018 | Pacala et al. |
| 2018/0209841 A1 | 7/2018 | Pacala et al. |
| 2018/0299554 A1 | 10/2018 | van Dyck |
| 2018/0306907 A1 | 10/2018 | Pacala et al. |
| 2018/0329065 A1 | 11/2018 | Pacala et al. |
| 2019/0018111 A1 | 1/2019 | Pacala et al. |
| 2019/0097653 A1 | 3/2019 | Zhang et al. |
| 2019/0103885 A1 | 4/2019 | Chang et al. |
| 2019/0288713 A1 | 9/2019 | Kumar et al. |
| 2020/0036959 A1* | 1/2020 | Pacala .................... G02B 5/208 |
| 2020/0041646 A1 | 2/2020 | Pacala et al. |
| 2020/0116559 A1* | 4/2020 | Pacala .................. G01S 7/4816 |
| 2020/0116560 A1 | 4/2020 | Pacala et al. |
| 2020/0116836 A1 | 4/2020 | Pacala et al. |
| 2020/0209355 A1 | 7/2020 | Pacala et al. |

FOREIGN PATENT DOCUMENTS

| | | |
|---|---|---|
| CN | 101563595 | 10/2009 |
| CN | 103048046 | 4/2013 |
| CN | 103234527 | 8/2013 |
| EP | 0095725 A1 | 12/1983 |
| EP | 2124069 A1 | 11/2009 |
| EP | 2615566 | 7/2013 |
| EP | 2908166 | 8/2015 |
| EP | 3045935 A1 | 7/2016 |
| EP | 3002548 A1 | 9/2016 |
| EP | 3316000 A1 | 5/2018 |
| JP | H3-6407 A | 1/1991 |
| JP | 07181023 | 7/1995 |
| JP | 07318325 | 12/1995 |
| JP | 09257440 | 10/1997 |
| JP | 10311950 | 11/1998 |
| JP | 2004247461 | 9/2004 |
| JP | 07-049417 A | 2/2007 |
| JP | 2007103590 | 4/2007 |
| JP | 2010128122 | 6/2010 |
| JP | 2012202776 | 10/2012 |
| JP | 2012530917 | 12/2012 |
| JP | 2013181912 | 9/2013 |
| JP | 2015137987 | 7/2015 |
| JP | 2016534346 | 11/2016 |
| KR | 20070112679 | 11/2007 |
| KR | 20120137432 | 12/2012 |
| KR | 20130038388 | 4/2013 |
| KR | 20150072439 | 6/2015 |
| WO | 2011063347 | 5/2011 |
| WO | 2012055966 | 5/2012 |
| WO | 2014150856 | 9/2014 |
| WO | 2015037211 | 3/2015 |
| WO | 2015052616 A1 | 4/2015 |
| WO | 2015136100 A2 | 9/2015 |
| WO | 2015163074 | 10/2015 |
| WO | 2016116733 A1 | 7/2016 |
| WO | 2016125165 A1 | 8/2016 |
| WO | 2017132704 A1 | 8/2017 |
| WO | 2018057084 | 3/2018 |
| WO | 2018065426 A1 | 4/2018 |
| WO | 2018065427 A1 | 4/2018 |
| WO | 2018065428 A3 | 4/2018 |
| WO | 2018065429 A1 | 4/2018 |

(56) References Cited

FOREIGN PATENT DOCUMENTS

WO 2018122415 A1 7/2018
WO 2018197441 A1 11/2018

OTHER PUBLICATIONS

U.S. Appl. No. 15/419,053, Notice of Allowance, dated Jan. 26, 2018, 12 pages.
U.S. Appl. No. 15/934,338, "Corrected Notice of Allowability", dated Jan. 13, 2020, 2 pages.
U.S. Appl. No. 15/934,338, Non-Final Office Action, dated May 15, 2019, 16 pages.
U.S. Appl. No. 15/934,338, Notice of Allowance, dated Sep. 17, 2019, 10 pages.
AU2017212835, "First Examination Report", dated Sep. 24, 2018, 5 pages.
AU2017212835, "Notice of Acceptance", dated Feb. 28, 2019, 3 pages.
AU2017212835, "Second Examination Report", dated Oct. 24, 2018, 3 pages.
Contini et al., "Time-Domain Diffuse Optics: Towards Next Generation Devices", Proceedings SPIE Diffuse Optical Imaging V, vol. 9538, Jul. 10, 2015, 95380A page.
Application No. EP17745102.8, Extended European Search Report, dated Sep. 9, 2019, 6 pages.
Application No. EP17745102.8, Office Action, dated Jul. 16, 2020, 4 pages.
Application No. EP17745102.8, Office Action, dated Mar. 6, 2020, 5 pages.
Application No. JP2018-559175, Notice of Decision to Grant, dated Aug. 11, 2020, 1 page.
Application No. JP2018-559175, Office Action, dated Dec. 23, 2019, 6 pages.
Application No. PCT/US2017/015683, International Preliminary Report on Patentability, dated Aug. 9, 2018, 12 pages.
Application No. PCT/US2017/015683, International Search Report and Written Opinion, dated Apr. 17, 2017, 12 pages.
Application No. RU2018130989, Office Action, dated Apr. 27, 2020, 21 pages.
Application No. SG11201806442Y, Written Opinion, dated Jan. 28, 2020, 9 pages.
Application No. TH1801004505, Office Action, dated Aug. 6, 2019, 2 pages.
Yang et al., "Wavelength Tuning of Vertical-Cavity Surface-Emitting Lasers by an Internal Device Heater", IEEE Photonics Technology Letters, vol. 20, Issue 20, Oct. 15, 2008, pp. 1679-1681.
Application No. ZA2018/05645, Notice of Allowance, dated Sep. 3, 2019, 1 page.
China National Intellectual Property Administration, Office Action received in Chinese application No. CN201780015714.1, dated Jun. 28, 2020, 10 pages.
DKPA201970244, "Office Action", dated Apr. 24, 2020, 8 pages.
U.S. Appl. No. 15/880,491, "Non-Final Office Action", dated Nov. 12, 2020, 9 pages.
CN201780068584.8, "Office Action", dated Nov. 3, 2020, 20 pages.
KR10-2019-7011974, "Office Action", dated Dec. 16, 2020, 4 pages.
RU2018130989, "Notice of Decision to Grant", dated Dec. 14, 2020, 21 pages.
SG11201806442Y, "Notice of Decision to Grant", dated Dec. 22, 2020, 5 pages.
U.S. Appl. No. 15/276,532, "Non-Final Office Action", dated Dec. 15, 2017, 15 pages.
U.S. Appl. No. 15/276,532, "Notice of Allowance", dated Apr. 11, 2018, 7 pages.
U.S. Appl. No. 15/861,330, "Notice of Allowance", dated May 29, 2018, 11 pages.

AU2017330180, "Notice of Acceptance", dated Jun. 17, 2019, 3 pages.
Le et al., "On the Use of Hard-Decision LDPC Decoders on MLC NAND Flash Memory", 15th International Multi-Conference on Systems, Signals & Devices (SSD), Mar. 2018, 6 pages.
PCT/US2017/039306, "International Preliminary Report on Patentability", dated Apr. 4, 2019, 17 pages.
SE1950477-8, "Office Action", dated Jan. 27, 2020, 8 pages.
PCTUS2017039306 "International Search Report and Written Opinion" dated Nov. 7, 2017 21 pages.
PCTUs2017039306 "Invitation to Pay Add'l Fees and Partial Search Report" dated Aug. 31, 2017 2 pages.
PCTUS2017/048379 "International Search Report and Written Opinion" dated Nov. 2, 2017, 15 pages.
Non-Final Office Action dated Jul. 28, 2017 in U.S. Appl. No. 15/419,053, filed Jan. 30, 2017, 26 pages.
Velodyne Lidar, Inc., HDL-32E Data Sheet 2010, 2017.
Velodyne Lidar, Inc., HDL-32E, User's Manual 2010.; Aug. 2016.
Velodyne Lidar, Inc., HDL-32E, HDL-32E, webpage: http://www.velodynelidar.com/hdl-32e.html; retrieved Dec. 6, 2017.
Velodyne Lidar, Inc., HDL-64E Data Sheet, 2017.
Velodyne Lidar, Inc., HDL-64E S2 and S2.1; User's Manual and Programming Guide 2007; Firmware version 4; 2007, revision Nov. 2012.
Velodyne Lidar, Inc., HDL-64E, S3; User's Manual and Programming Guide revision J; 2007.; Dec. 2017.
Velodyne Lidar, Inc., HDL-64E; webpage: http://www.velodynelidar.com/hdl-64e.html; retrieved Dec. 6, 2017.
Velodyne Lidar, Inc., VLP-16 data sheet, Puck, Real Time 3D Lidar Sensor, 2014.
Velodyne Lidar Inc., Velodyne Lidar Puck; User's Manual and Programming Guide; 2014.
Velodyne Lidar, Inc., VLP-16; retrieved via website: http://www.velodynelidar.com/vlp-16.html; Dec. 6, 2017.
Velodyne, Lidar, Inc.; Puck Hi-Res Data Sheet; Sep. 2016.
Velodyne Lidar, Inc.; Puck Hi-Res User Manual; Sep. 2016.
Velodyne Lidar, Inc.; Puck Hi-Res retrieved via website: http://www.velodynelidar.com/vlp-16-hi-res.html; Dec. 13, 2017.
Velodyne Lidar, Inc.; Puck Lite Data Sheet; Feb. 2016.
Velodyne Lidar, Inc.; Puck Lite User Manual; Feb. 2016.
Velodyne Lidar, Inc.; Puck Lite, Our Lightest Sensor Ever, Apr. 2016; retrieved via website: http://www.velodynelidar.com/vlp-16-lite.html; Dec. 13, 2017.
Velodyne Lidar, Inc.,; Ultra Puck VLP-32C; Nov. 2017; retrieved via website: http://www.velodynelidar.com/vlp-32c.html; Dec. 13, 2017.
Bronzi, Danilo, "100 000 Frames/s 64x32 Single Photon Detector Array for 2-D Imaging and 3-D Ranging", IEEE Journal of Selected Topic in Quantum Electronics, vol. 20, No. 6, Nov./Dec. 2014; 10 pages.
Quanergy Systems Ex, 1005, Review of Scientific Instruments; vol. 72, No. 4, Apr. 2001, 13 pages.
Itzler, Mark A., "Geiger-mode avalance photodiode focal plane arrays for three-dimensional imaging LADAR" Princeton Lightwave, Inc., Proc of SPIE vol. 7808 780890C-, 14 pages.
Cova, Sergio D.; Single-Photon Counting Detectors, IEEE Photonics Journal; vol. 3, No. 2, Apr. 2011, 5 pages.
Guerrieri, Fabrizio, Two-Dimensional SPAD Imaging Camera for Photon Counting, vol. 2, No. 5, Oct. 2010, 17 pages.
Charbon, Edoardo, et al. "SPAD-Based Sensors"; TOF Range-Imaging Cameras, Remondino, F..; Stoppa D. (Eds.), 2013, V, 240 p. 138 Illus., 85 Illus. In color., Hardcover ISBN 978-3-642-27522-7, 2013.
U.S. Appl. No. 15/880,491, "Corrected Notice of Allowability", dated Feb. 25, 2021, 2 pages.
U.S. Appl. No. 15/880,491, "Notice of Allowability", dated Mar. 16, 2021, 2 pages.
U.S. Appl. No. 16/584,515, Notice of Allowance, dated Mar. 12, 2021, 11 pages.
Application No. CN201780015714.1, Office Action, dated Mar. 11, 2021, 18 pages.
Application No. DKPA201970244, Office Action, dated Feb. 12, 2021, 3 pages.

(56) References Cited

OTHER PUBLICATIONS

Application No. JP2019-516177, Office Action, dated Apr. 1, 2021, 4 pages.
U.S. Appl. No. 15/880,491, "Notice of Allowance", dated Feb. 2, 2021, 7 pages.
IN201847031610, "First Examination Report", dated Jan. 28, 2021, 5 pages.
"U.S. Appl. No. 17/317,809", Optical System for Collecting Distance Information Within a Field, filed May 11, 2021, 40 pages.
"U.S. Appl. No. 17/323,962", Optical System for Collecting Distance Information Within a Field, filed May 18, 2021, 39 pages.
U.S. Appl. No. 17/317,809, filed May 11, 2021, 81 pages.
U.S. Appl. No. 17/323,962, filed May 18, 2021, 78 pages.
CN201780015714.1, "Supplemental Search Report", dated Mar. 4, 2021, 1 page.
U.S. Appl. No. 17/323,962, Non-Final Office Action, dated Aug. 31, 2021, 9 pages.
U.S. Appl. No. 16/584,515, Notice of Allowance, dated Aug. 13, 2021, 10 pages.
U.S. Appl. No. 17/317,809, Notice of Allowance, dated Aug. 18, 2021, 33 pages.
U.S. Appl. No. 17/323,962, "Notice of Allowance", dated Sep. 29, 2021, 7 pages.

\* cited by examiner

OPTICAL IMAGING SYSTEM WITH A PLURALITY OF SENSE CHANNELS

CROSS-REFERENCE TO RELATED APPLICATIONS

This application is a continuation of U.S. patent application Ser. No. 15/880,491, filed Jan. 25, 2018, which is a continuation of U.S. patent application Ser. No. 15/276,532 ("the '532 application"), filed Sep. 26, 2016; which claims the benefit of U.S. Provisional Patent Application No. 62/232,222 ("the '222 application") filed Sep. 24, 2015. The present application is also related to U.S. patent application Ser. No. 15/861,330, filed on Jan. 3, 2018, which is a continuation-in-part of the '532 application. The disclosures of the '532 and '222 applications are each incorporated by reference herein in their entirety.

BACKGROUND OF THE INVENTION

Field of the Invention

This invention relates generally to the field of optical sensors and more specifically to a new and useful optical system for collecting distance information in the field of optical sensors.

DETAILED DESCRIPTION OF THE PREFERRED EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. One-Dimensional Optical System: Aperture Array

Figure 1:
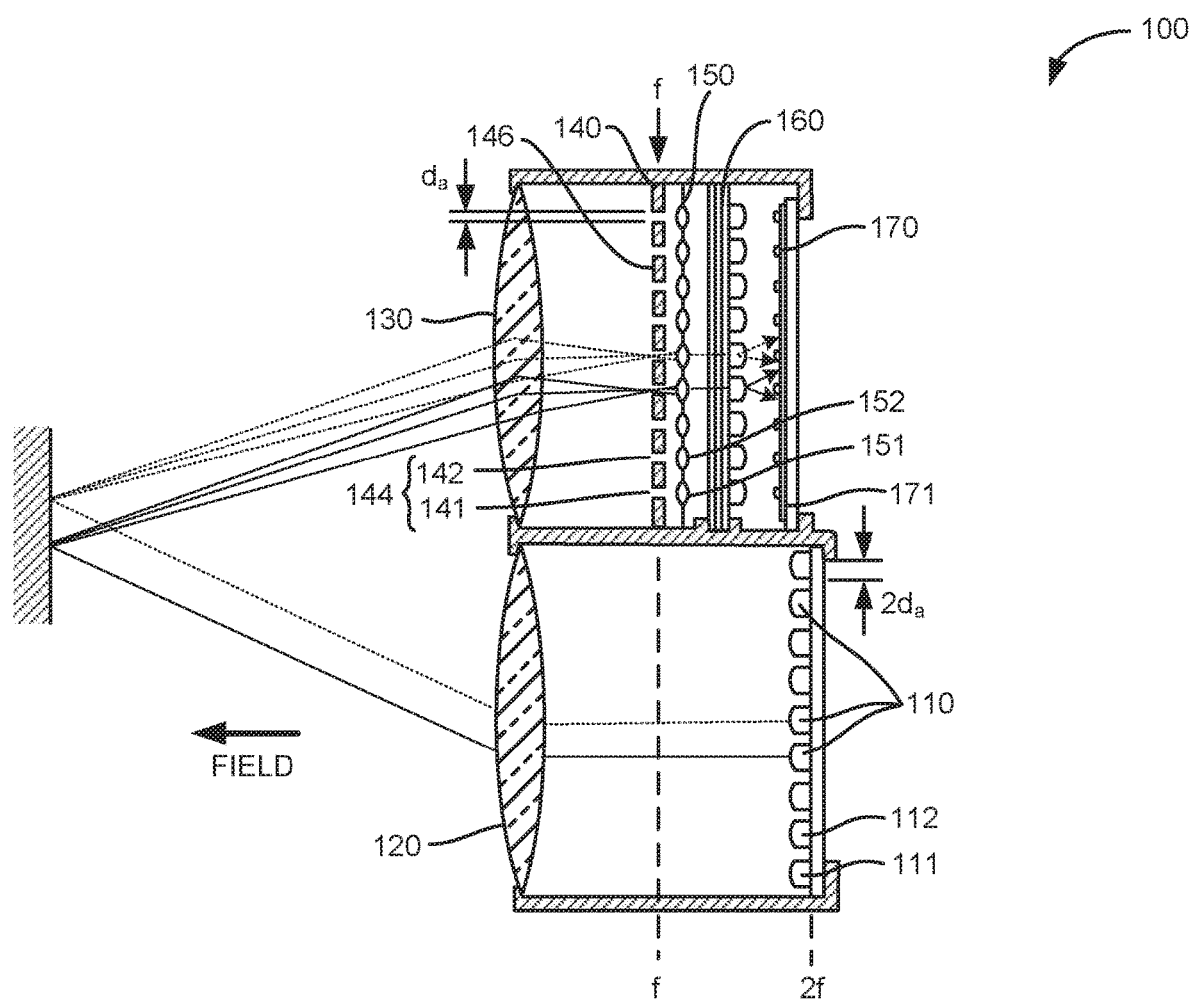
FIG. 1 is a schematic representation of a system.

As shown in FIG. 1, a one-dimensional optical system 100 for collecting distance information within a field includes: a set of illumination sources 110 arranged along a first axis, each illumination source in the set of illumination sources 110 configured to output an illuminating beam of an operating wavelength toward a discrete spot in the field ahead of the illumination source; a bulk imaging optic 130 characterized by a focal plane opposite the field; an aperture layer 140 coincident the focal plane, defining a set of apertures 144 in a line array parallel to the first axis, and defining a stop region 146 around the set of apertures 144, each aperture in the set of apertures 144 defining a field of view in the field coincident a discrete spot output by a corresponding illumination source in the set of illumination sources 110, the stop region 146 absorbing light rays reflected from surfaces in the field outside of fields of view defined by the set of apertures 144 and passing through the bulk imaging optic 130; a set of lenses 150, each lens in the set of lenses 150 characterized by a second focal length, offset from the focal plane opposite the bulk imaging optic 130 by the second focal length, aligned with an aperture in the set of apertures 144, and configured to collimate light rays passed by the aperture; an optical filter 160 adjacent the set of lenses 150 opposite the aperture layer 140 and configured to pass light rays at the operating wavelength; a set of pixels 170 adjacent the optical filter 160 opposite the set of lenses 150, each pixel in the set of pixels 170 corresponding to a lens in the set of lenses 150 and including a set of subpixels arranged along a second axis non-parallel to the first axis; and a diffuser 180 interposed between the optical filter 160 and the set of pixels 170 and configured to spread collimated light output from each lens in the set of lenses 150 across a set of subpixels of a corresponding pixel in the set of pixels 170.

1.1 Applications

Generally, the one-dimensional optical system 100 (the "system") functions as an image sensor that, when rotated about an axis parallel to a column of apertures, collects three-dimensional distance data of a volume occupied by the system. Specifically, the one-dimensional optical system 100 can scan a volume to collect three-dimensional distance data that can then be reconstructed into a virtual three-dimensional representation of the volume, such as based on recorded times between transmission of illuminating beams from the illumination sources and detection of photons—likely originating from the illumination sources—incident on the set of pixels 170, based on phase-based measurements techniques, or based on any other suitable distance measurement technique. The system 100 includes: a column of offset apertures arranged behind a bulk imaging optic 130 and defining discrete fields of view in a field ahead of the bulk imaging optic 130 (that is non-overlapping fields of view beyond a threshold distance from the system); a set of illumination sources 110 that project discrete illuminating beams at an operating wavelength into (and substantially only into) the fields of view defined by the apertures; a column of lenses that collimate light rays passed by corresponding apertures; and an optical filter 160 that selectively passes a narrow band of wavelengths of light (i.e., electromagnetic radiation) including the operating wavelength; and a set of pixels 170 that detect incident photons (e.g., count incident photons, tracks times between consecutive incident photons). The system can therefore selectively project illuminating beams into a field ahead of the system according to an illumination pattern that substantially matches—in size and geometry across a range of distances from the system—the fields of view of the apertures. In particular, the illumination sources are configured to illuminate substantially only surfaces in the field ahead of the system that can be detected by pixels in the system such that minimal power output by the system (via the illumination sources) is wasted by illuminating surfaces in the field for which the pixels are blind. The system can therefore achieve a relatively high ratio of output signal (i.e., illuminating beam power) to input signal (i.e., photons passed to an incident on the pixel array). Furthermore, the set of lenses 150 can collimate light rays passed by adjacent apertures such that light rays incident on the optical filter 160 meet the optical filter 160 at an angle of incidence of approximately 0°, thereby maintaining a relatively narrow band of wavelengths of light passed by the optical filter 160 and achieving a relatively high signal-to-noise ratio ("SNR") for light rays reaching the set of pixels 170.

The system includes pixels arranged in a column and aligned with the apertures, and each pixel can be non-square in geometry (e.g., short and wide) to extend the sensing area of the system for a fixed aperture pitch and pixel column height. The system also includes a diffuser 180 that spreads light rays passed from an aperture through the optical filter 160 across the area of a corresponding pixel such that the pixel can detect incident photons across its full width and height thereby increasing the dynamic range of the system.

The system is described herein as projecting electromagnetic radiation into a field and detecting electromagnetic radiation reflected from a surface in the field back to bulk receiver optic. Terms "illumination beam," "light," "light rays," and "photons" recited herein refer to such electromagnetic radiation. The term "channel" recited herein refers to one aperture in the aperture layer 140, a corresponding lens in the set of lenses 150, and a corresponding pixel in the set of pixels 170.

1.2 Bulk Imaging Optic

The system includes a bulk imaging optic 130 characterized by a focal plane opposite the field. Generally, the bulk imaging optic 130 functions to project incident light rays from outside the system toward the focal plane where light rays incident on a stop region 146 of the aperture layer 140 are rejected (e.g., mirrored or absorbed) and where light rays incident on apertures in the aperture layer 140 are passed into a lens characterized by a focal length and offset from the focal plane by the focal length.

Figure 11:
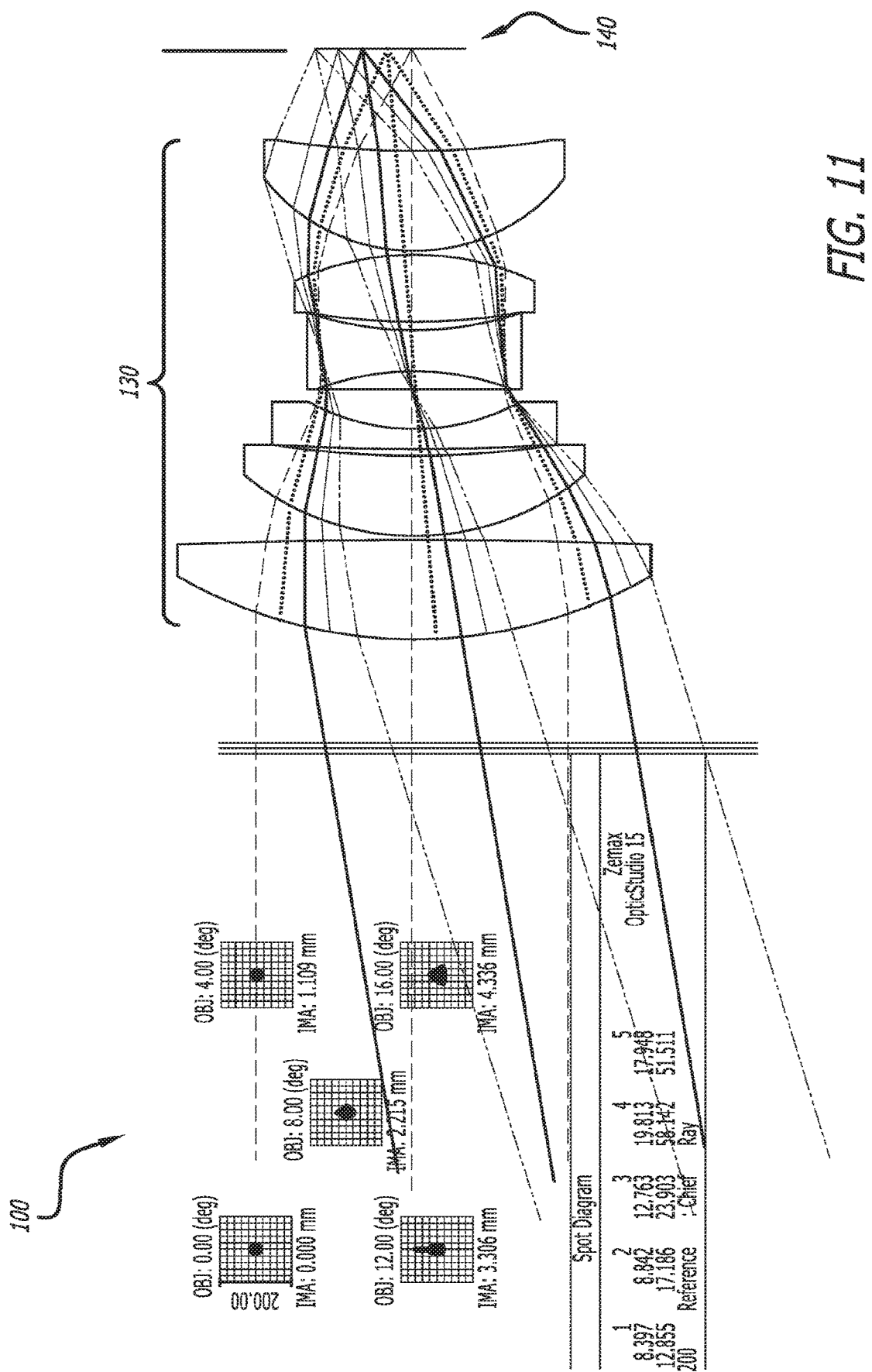
FIG. 11 is a schematic representation in accordance with one variation of the system.

In one implementation, the bulk imaging optic 130 includes a converging lens, such as a bi-convex lens (shown in FIG. 2) or a plano-convex lens, characterized by a particular focal length at the operating wavelength of the system. The bulk imaging optic 130 can also include multiple discrete lens that cooperate to project light rays toward the aperture layer 140 and that are characterized by a composite focal plane opposite the field, as shown in FIG. 11. However, the bulk imaging optic 130 can be any other suitable type of lens or combination of lenses of any other type or geometry.

1.3 Aperture Layer

Figure 2:
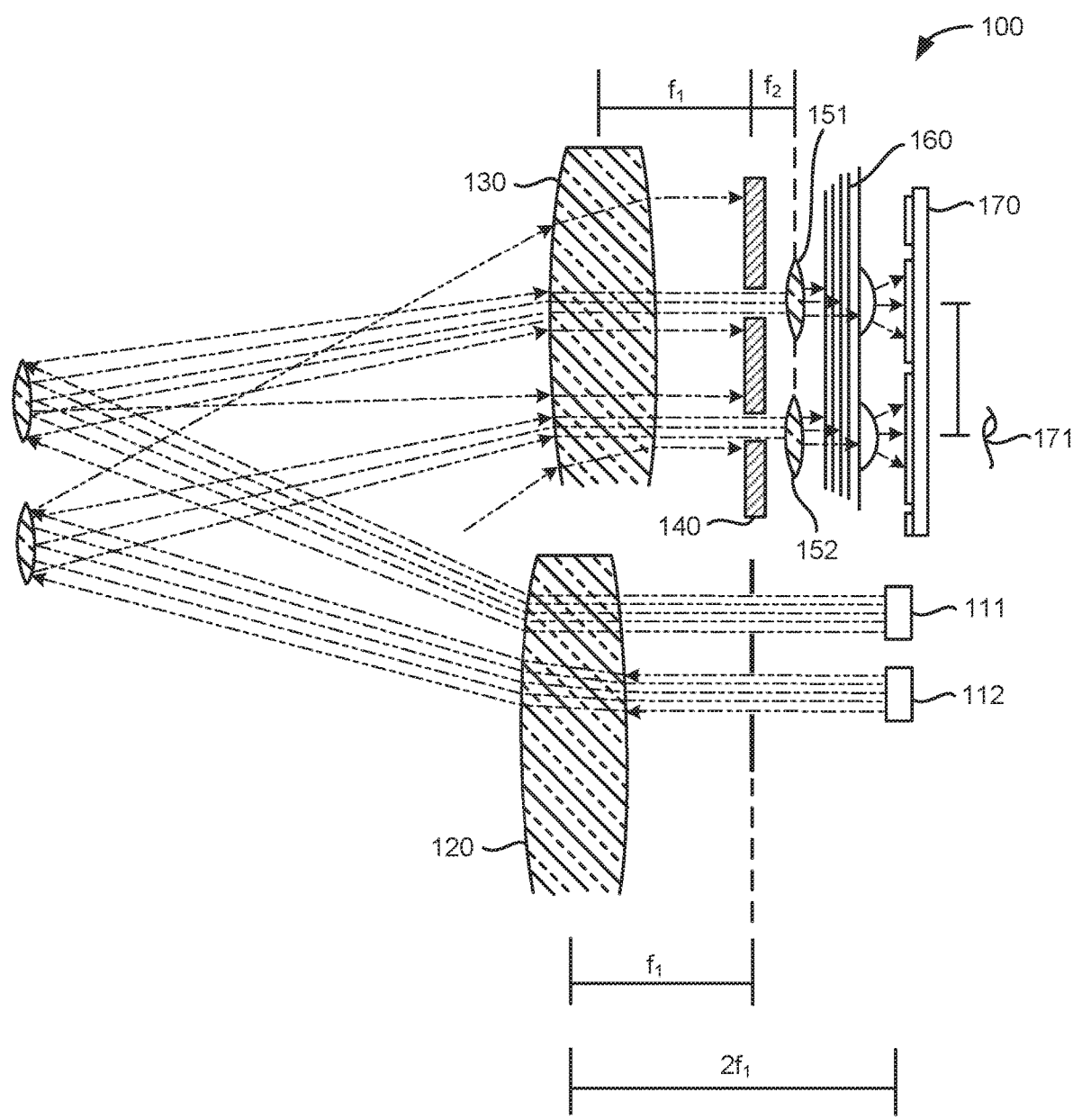
FIG. 2 is a schematic representation in accordance with one variation of the system.
Figure 6:
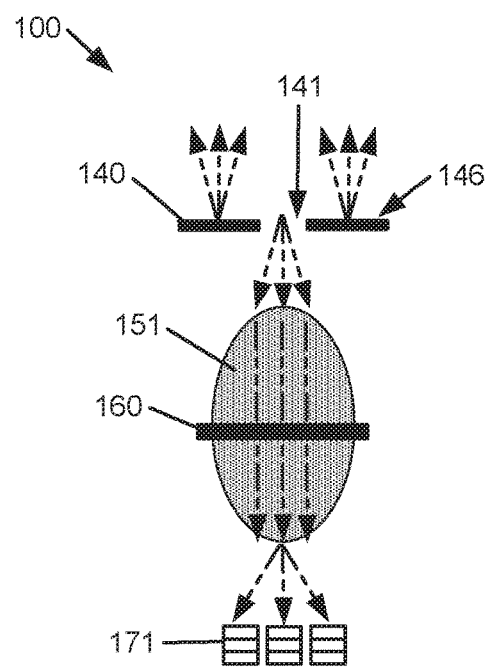
FIG. 6 is a schematic representation in accordance with one variation of the system.

As shown in FIGS. 1 and 2, the system includes an aperture layer 140 coincident the focal plane, defining a set of apertures 144 in a line array parallel to the axes of the illumination sources, and defining a stop region 146 around the set of apertures 144, wherein each aperture in the set of apertures 144 defines a field of view in the field coincident a discrete spot output by a corresponding illumination source in the set of illumination sources 110, and wherein the stop region 146 absorbs and/or reflects light rays reflected from surfaces in the field outside of fields of view defined by the set of apertures 144 and passing through the bulk imaging optic 130. Generally, the aperture layer 140 defines an array of open regions (i.e., apertures, including one aperture per lens) and closed regions ("stop regions") between adjacent opens. Each aperture in the aperture layer 140 defines a "pinhole" that defines a field of view for its corresponding sense channel and passes light rights reflected from an external surface within its field of the view into its corresponding lens, and each stop region 146 can block light rays incident on select regions of the focal plane from passing into the lens array, as shown in FIG. 6.

The aperture layer 140 includes a relatively thin opaque structure coinciding with (e.g., arranged along) the focal plane of the bulk imaging optic 130, as shown in FIGS. 1 and 2. For example, the aperture layer 140 can include a 10 micrometer-thick copper, silver, or nickel film deposited (e.g., plated) over a photocurable transparent polymer and then selectively etched to form the array of apertures. In a similar example, a reflective metalized layer or a light-absorbing photopolymer (e.g., a photopolymer mixed with a light absorbing dye) can be deposited onto a glass wafer and selectively cured with a photomask to form the aperture layer 140 and the set of apertures 144. Alternatively, the aperture layer 140 can include a discrete metallic film that is mechanically or chemically perforated to form the array of apertures, bonded to the lens array, and then installed over the bulk imaging optic 130 along the focal plane. However, the aperture layer 140 can include any other reflective (e.g., mirrored) or light-absorbing material formed in any other way to define the array of apertures along the focal plane of the bulk imaging optic 130.

Figure 3:
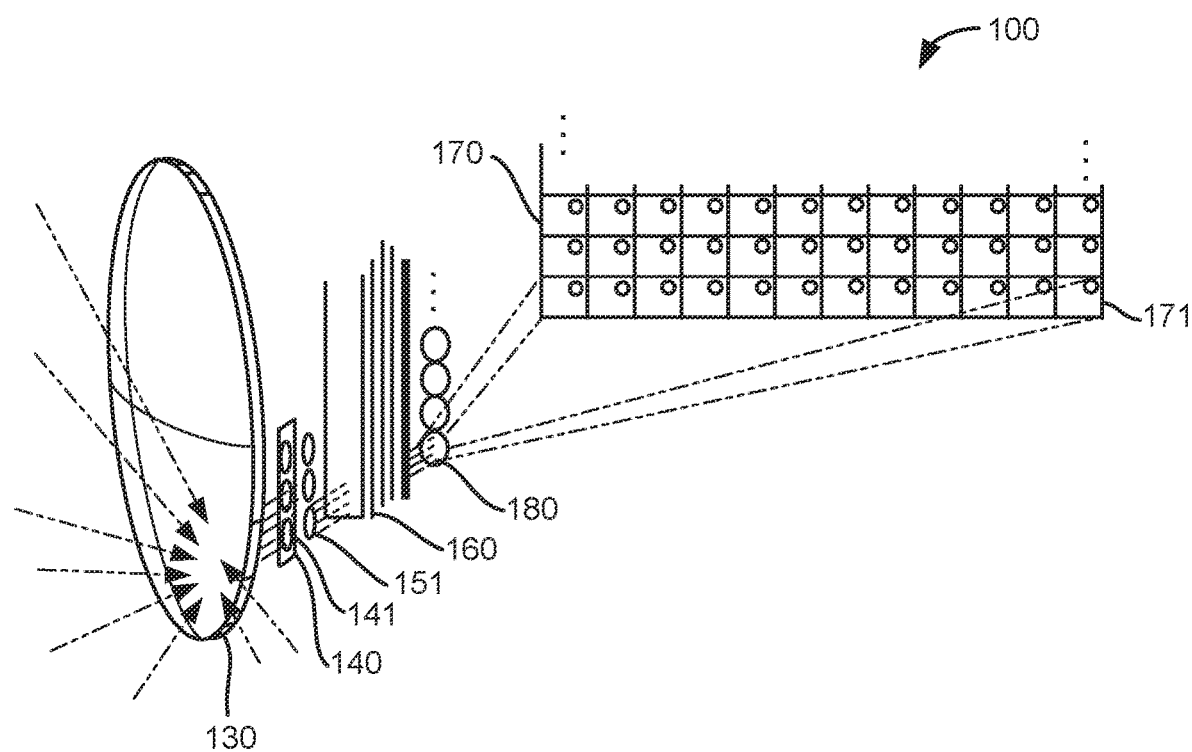
FIG. 3 is a schematic representation in accordance with one variation of the system.

In the one-dimensional optical system 100, the aperture layer 140 can define a single column of multiple discrete circular apertures of substantially uniform diameter, wherein each aperture defines an axis substantially parallel to and aligned with one lens in the lens array, as shown in FIG. 3. Adjacent apertures are offset by an aperture pitch distance greater than the aperture diameter and substantially similar to the lens pitch distance, and the aperture layer 140 defines a stop region 146 (i.e., an opaque or reflecting region) between adjacent apertures such that the apertures define discrete, non-overlapping fields of view for their corresponding sense channels. At increasingly smaller diameters up to a diffraction-limited diameter—which is a function of wavelength of incident light and numeric aperture of the bulk imaging lens—an aperture defines a narrower field of view (i.e., a field of view of smaller diameter) and passes a sharper but lower-intensity (attenuated) signal from the bulk imaging optic 130 into its corresponding lens. The aperture layer 140 can therefore define apertures of diameter: greater than the diffraction-limited diameter for the wavelength of light output by the illumination sources (e.g., 900 nm); substantially greater than the thickness of the aperture layer 140; and less than the aperture pitch distance, which is substantially equivalent to the lens pitch distance and the pixel pitch distance. In one example, aperture layer 140 can define apertures of diameters approaching the diffraction-limited diameter to maximize geometrical selectivity of the field of view of each sense channel. Alternatively, the apertures can be of diameter less that the diffraction-limited diameter for the wavelength of light output by the illumination sources. In one example, the aperture layer 140 can define apertures of diameters matched to a power output of illumination sources in the system and to a number and photon detection capacity of subpixel photodetectors in each pixel in the set of pixels 170 to achieve a target number of photons incident on each pixel within each sampling period. In this example, each aperture can define a particular diameter that achieves target attenuation range for pixels originating from a corresponding illumination source and incident on the bulk imaging optic 130 during a sampling period. In particular, because an aperture in the aperture layer 140 attenuates a signal passed to its corresponding lens and on to its corresponding pixel, the diameter of the aperture can be matched to the dynamic range of its corresponding pixel.

In one implementation, a first aperture 141 in the aperture layer 140 passes light rays—reflected from a discrete region of a surface in the field (the field of view of the sense channel) ahead of the bulk imaging optic 130—into its corresponding lens; a stop region 146 interposed between the first aperture 141 and adjacent apertures in the aperture layer 140 blocks light rays—reflected from a region of the surface outside of the field of view of the first aperture 141—from passing into the lens corresponding to the first aperture 141. In the one-dimensional optical system 100, the aperture layer 140 therefore defines a column of apertures that define multiple discrete, non-overlapping fields of view of substantially infinite depth of field, as shown in FIG. 2.

In this implementation, a first aperture 141 in the aperture layer 140 defines a field of view that is distinct and that does not intersect a field of view defined by another aperture in the aperture layer 140, as shown in FIG. 2. The set of illumination sources 110 includes a first illumination source 111 paired with the first aperture 141 and configured to project an illuminating beam substantially aligned with (i.e., overlapping) the field of view of the first aperture 141 in the field ahead of the bulk imaging optic 130. Furthermore, the first illumination source 111 and a bulk transmitting optic 120 can cooperate to project an illuminating beam of a cross-section substantially similar to (and slightly larger than) the cross section of the field of view of the first aperture 141 as various distances from the bulk imaging optic 130. Therefore light output by the first illumination source 111—paired with the first aperture 141—and projected into the field of view of the first aperture 141 can remain substantially outside the fields of view of other apertures in the aperture layer 140.

Generally, photons projected into the field by the first illumination source 111 illuminate a particular region of a surface (or multiple surfaces) in the field within the field of view of the first sense channel and are reflected (e.g., scattered) by the surface(s); at least some of these photons reflected by the particular region of a surface may reach the bulk imaging optic 130, which directs these photons toward the focal plane. Because these photons were reflected by a region of a surface within the field of view of the first aperture 141, the bulk imaging optic 130 may project these photons into the first aperture 141, and the first aperture 141 may pass these photons into the first lens 151 (or a subset of these photons incident at an angle relative to the axis of the first aperture 141 below a threshold angle). However, because a second aperture 142 in the aperture layer 140 is offset from the first aperture 141 and because the particular region of the surface in the field illuminated via the first illumination source 111 does not (substantially) coincide with the field of view of the second aperture 142, photons reflected by the particular region of the surface and reaching the bulk imaging optic 130 are projected into the second aperture 142 and passed to a second lens 152 behind the second aperture 142, and vice versa, as shown in FIG. 2. Furthermore, a stop region 146 between the first and second apertures 142 can block photons directed toward the focal plane between the first and second apertures 142 reflected by the bulk imaging optic 130, thereby reducing crosstalk between the first and second sense channels.

Figure 4:
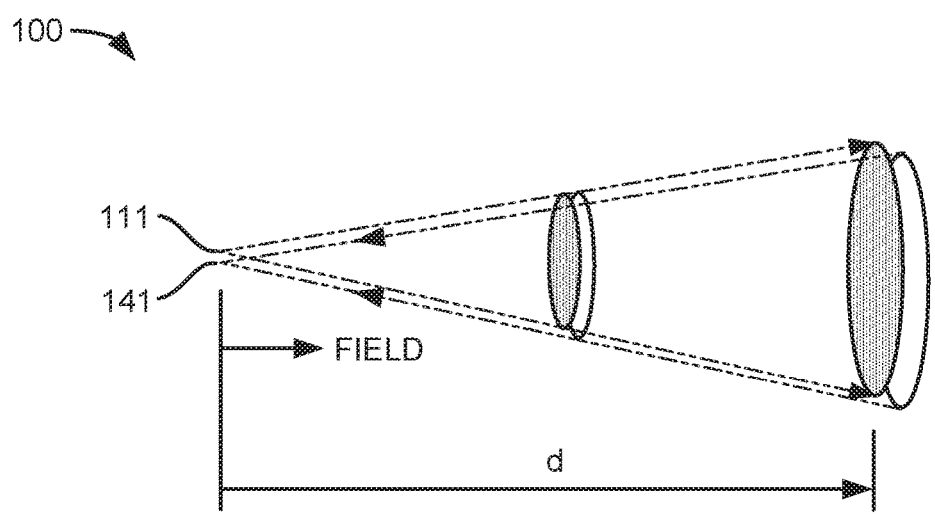
FIG. 4 is a schematic representation in accordance with one variation of the system.

For a first aperture 141 in the aperture layer 140 paired with a first illumination source 111 in the set of illumination sources 110, the first aperture 141 in the aperture layer 140 defines a first field of view and passes—into the first lens 151—incident light rays originating at or reflected from a surface in the field coinciding with the first field of view. Because the first illumination source 111 projects an illuminating beam that is substantially coincident (and substantially the same size as or minimally larger than) the field of view defined by the first aperture 141 (as shown in FIG. 4), a signal passed into the first lens 151 by the first aperture 141 in the aperture layer 140 can exhibit a relatively high ratio of light rays originating from the first illumination source 111 to light rays originating from other illumination sources in the system. Generally, because various illumination sources in the system may output illuminating beams at different frequencies, duty cycles, and/or power levels, etc. at a particular time during operation, light rays passed from the bulk imaging optic 130 into a first pixel 171 in the set of pixels 170 but originating from an illumination source other than the first illumination source 111 paired with the first pixel 171 constitute noise at the first pixel 171. Though the relatively small diameters of apertures in the aperture layer 140 may attenuate a total light signal passed from the bulk imaging optic 130 into the set of lenses 150, each aperture in the aperture layer 140 may pass a relatively high proportion of photons originating from its corresponding illumination source than from other illumination sources in the system; that is, due to the geometry of a particular aperture and its corresponding illumination source, a particular aperture may pass a signal exhibiting a relatively high SNR to its corresponding lens and thus into its corresponding pixel. Furthermore, at smaller aperture diameters in the aperture layer 140—and therefore smaller fields of view of corresponding channels—the system can pass less noise from solar radiation or other ambient light sources to the set of pixels 170.

In one variation, the system includes a second aperture layer interposed between the lens array and the optical filter 160, wherein the second aperture layer defines a second set of apertures 144, each aligned with a corresponding lens in the set of lenses 150, as described above. In this variation, an aperture in the second aperture layer 140 can absorb or reflect errant light rays passed by a corresponding lens, as described above, to further reduce crosstalk between channels, thereby improving SNR within the system. Similarly, the system can additionally or alternatively include a third aperture layer interposed between the optical filter 160 and the diffuser(s) 180, wherein the third aperture layer defines a third set of apertures 144, each aligned with a corresponding lens in the set of lenses 150, as described above. In this variation, an aperture in the third aperture layer can absorb or reflect errant light rays passed by the light filter, as described above, to again reduce crosstalk between channels, thereby improving SNR within the system.

1.4 Lens Array

The system includes a set of lenses 150, wherein each lens in the set of lenses 150 is characterized by a second focal length, is offset from the focal plane opposite the bulk imaging optic 130 by the second focal length, is aligned with a corresponding aperture in the set of apertures 144, and is configured to collimate light rays passed by the corresponding aperture. Generally, a lens in the set of lenses 150 functions to collimate lights rays passed by its corresponding aperture and to pass these collimated light rays into the optical filter 160.

In the one-dimensional optical system 100, the lenses are arranged in a single column, and adjacent lenses are offset by a uniform lens pitch distance (i.e., a center-to-center-distance between adjacent pixels), as shown in FIG. 3. The set of lenses 150 is interposed between the aperture layer and the optical filter 160. In particular, each lens can include a converging lens characterized by a second focal length and can be offset from the focal plane of the bulk imaging optic 130—opposite the bulk imaging optic 130—by the second focal length to preserve the aperture of the bulk imaging optic 130 and to collimate light incident on the bulk imaging optic 130 and passed by a corresponding aperture. Each lens in the set of lens can be characterized by a relatively short focal length (i.e., less than a focal length of the bulk imaging optic 130) and a relatively large marginal ray angle (e.g., a relatively high numeric aperture lens) such that the lens can capture highly-angled light rays projected toward the lens by the extent of the bulk imaging optic 130. That is, each lens in the set of lens can be characterized by a ray cone substantially matched to a ray cone of the bulk imaging optic 130.

Lenses in the set of lenses 150 can be substantially similar. A lens in the set of lenses 150 is configured to collimate light rays focused into its corresponding aperture by the bulk imaging optic 130. For example, a lens in the set of lenses 150 can include a bi-convex or plano-convex lens characterized by a focal length selected based on the size (e.g., diameter) of its corresponding aperture and the operating wavelength of the system. In this example, the focal length (f) of a lens in the set of lenses 150 can be calculated according to the formula:

$$f = \frac{d^2}{2\lambda}$$

where d is the diameter of the corresponding aperture in the aperture layer and $\lambda$ is the operating wavelength of light output by the illumination source (e.g., 900 nm). The geometry of a lens in the set of lenses 150 can therefore be matched to the geometry of a corresponding aperture in the aperture layer such that the lens passes a substantially sharp image of light rays—at or near the operating wavelength—into the optical filter 160 and thus on to the pixel array.

However, the set of lenses 150 can include lenses of any other geometry and arranged in any other way adjacent the aperture layer.

1.5 Optical Filter

As shown in FIG. 3, the system includes an optical filter 160 adjacent the set of lenses 150 opposite the aperture layer and configured to pass light rays at the operating wavelength. Generally, the optical filter 160 receives electromagnetic radiation across a spectrum from the set of lenses 150, passes a relatively narrow band of electromagnetic radiation—including radiation at the operating wavelength—to the pixel array, and blocks electromagnetic radiation outside of the band. In particular, electromagnetic radiation other than electromagnetic radiation output by the illumination source—such as ambient light—incident on a pixel in the set of pixels 170 constitutes noise in the system. The optical filter 160 therefore functions to reject electromagnetic radiation outside of the operating wavelength or, more pragmatically, outside of a narrow wavelength band, thereby reducing noise in the system and increasing SNR.

In one implementation, the optical filter 160 includes an optical bandpass filter that passes a narrow band of electromagnetic radiation substantially centered at the operating wavelength of the system. In one example, the illumination sources output light (predominantly) at an operating wavelength of 900 nm, and the optical filter 160 is configured to pass light between 899.95 nm and 900.05 nm and to block light outside of this band.

The optical filter 160 may selectively pass and reject wavelengths of light as a function of angle of incidence on the optical filter 160. Generally, optical bandpass filters may pass wavelengths of light inversely proportional to their angle of incidence on the light optical bandpass filter. For example, for an optical filter 160 including a 0.5 nm-wide optical bandpass filter, the optical filter 160 may pass over 95% of electromagnetic radiation over a sharp band from 899.75 nm to 900.25 nm and reject approximately 100% of electromagnetic radiation below 899.70 nm and above 900.30 nm for light rays incident on the optical filter 160 at an angle of incidence of approximately 0°. However, in this example, the optical filter 160 may pass over 95% of electromagnetic radiation over a narrow band from 899.5 nm to 900.00 nm and reject approximately 100% of electromagnetic radiation over a much wider band below 899.50 nm and above 900.30 nm for light rays incident on the optical filter 160 at an angle of incidence of approximately 15°. Therefore, the incidence plane of the optical filter 160 can be substantially normal to the axes of the lenses, and the set of lenses 150 can collimate light rays received through a corresponding aperture and output these light rays substantially normal to the incidence plane of the optical filter 160 (i.e., at an angle of incidence of approximately 0° on the optical filter). Specifically, the set of lenses 150 can output light rays toward the optical filter 160 at angles of incidence approximating 0° such that substantially all electromagnetic radiation passed by the optical filter 160 is at or very near the operating wavelength of the system.

In the one-dimensional optical system 100, the system can include a single optical filter 160 that spans the column of lens in the set of lenses 150. Alternatively, the system can include multiple optical filters 160, each adjacent a single lens or a subset of lenses in the set of lenses 150. However, the optical filter 160 can define any other geometry and can function in any other way to pass only a limited band of wavelengths of light.

1.6 Pixel Array and Diffuser

The system includes a set of pixels 170 adjacent the optical filter 160 opposite the set of lenses 150, each pixel in the set of pixels 170 corresponding to a lens in the set of lenses 150 and including a set of subpixels arranged along a second axis non-parallel to the first axis. Generally, the set of pixels 170 are offset from the optical filter 160 opposite the set of lenses 150, and each pixel in the set of pixels 170 functions to output a single signal or stream of signals corresponding to the count of photons incident on the pixel within one or more sampling periods, wherein each sampling period may be picoseconds, nanoseconds, microseconds, or milliseconds in duration.

The system also includes a diffuser 180 interposed between the optical filter 160 and the set of pixels 170 and configured to spread collimated light output from each lens in the set of lenses 150 across a set of subpixels of a single corresponding pixel in the set of pixels 170. Generally, for each lens in the set of lenses 150, the diffuser 180 functions to spread light rays—previously collimated by the lens and passed by the optical filter 160—across the width and height of a sensing area within a corresponding pixel. The diffuser 180 can define a single optic element spanning the set of lenses 150, or the diffuser 180 can include multiple discrete optical elements, such as including one optical diffuser element aligned with each channel in the system.

Figure 5:
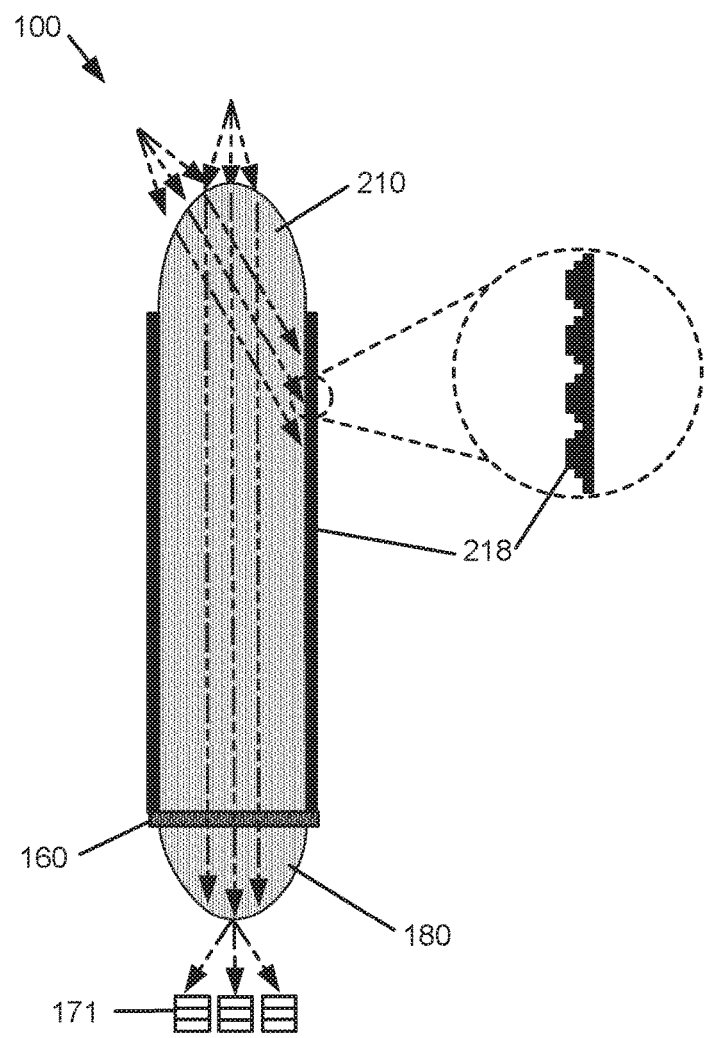
FIG. 5 is a schematic representation in accordance with one variation of the system.

In one implementation, a first pixel 171 in the set of pixels 170 includes an array of single-photon avalanche diode detectors (hereinafter "SPADs"), and the diffuser 180 spreads lights rays—previously passed by a corresponding first aperture 141, collimated by a corresponding first lens 151, and passed by the optical filter 160—across the area of the first pixel 171, as shown in FIGS. 3, 5, and 6. Generally, adjacent apertures can be aligned and offset vertically by an aperture pitch distance, adjacent lenses can be aligned and offset vertically by a lens pitch distance substantially identical to the aperture pitch distance, and adjacent pixels can be aligned and offset vertically by a pixel pitch distance substantially identical to the lens and aperture pitch distances. However, the pixel pitch distance may accommodate only a relatively small number of (e.g., two) vertically-stacked SPADs. Each pixel in the set of pixels 170 can therefore define an aspect ratio greater than 1:1, and the diffuser 180 can spread light rays passed by the optical filter 160 according to the geometry of a corresponding pixel in order to accommodate a larger sensing area per pixel.

In one example, each pixel in the set of pixels 170 is arranged on an image sensor, and a first pixel 171 in the set of pixels 170 includes a single row of 16 SPADs spaced along a lateral axis perpendicular to a vertical axis bisecting the column of apertures and lenses. In this example, the height of a single SPAD in the first pixel 171 can be less than the height (e.g., diameter) of the first lens 151, but the total length of the 16 SPADs can be greater than the width (e.g., diameter) of the first lens 151; the diffuser 180 can therefore converge light rays output from the first lens 151 to a height corresponding to the height of a SPAD at the plane of the first pixel 171 and can diverge light rays output from the first lens 151 to a width corresponding to the width of the 16 SPADs at the plane of the first pixel 171. In this example, the remaining pixels in the set of pixels 170 can include similar rows of SPADs, and the diffuser 180 can similarly converge and diverge light rays passed by corresponding apertures onto corresponding pixels.

In the foregoing example, the aperture layer can include a column of 16 like apertures, the set of lenses 150 can include a column of 16 like lenses arranged behind the aperture layer, and the set of pixels 170 can include a set of 16 like pixels—each including a similar array of SPADs—arranged behind the set of lenses 150. For a 6.4 mm-wide, 6.4 mm-tall image sensor, each pixel can include a single row of 16 SPADs, wherein each SPAD is electrically coupled to a remote analog front-end processing electronics/digital processing electronics circuit 240. Each SPAD can be arranged in a 400 µm-wide, 400 µm-tall SPAD area and can define an active sensing area approaching 400 µm in diameter. Adjacent SPADs can be offset by a SPAD pitch distance of 400 µm. In this example, the aperture pitch distance along the vertical column of apertures, the lens pitch distance along the vertical column of lenses, and the pixel pitch distance along the vertical column of pixels can each be approximately 400 µm accordingly. For the first sense channel in the system (i.e., the first aperture 141, the first lens 151, and the first pixel 171, etc.), a first diffuser 180 can diverge a cylindrical column of light rays passed from the first lens 151 through the optical filter 160—such as a column of light approximately 100 µm in diameter for an aperture layer aspect ratio of 1:4—to a height of approximately 400 µm aligned vertically with the row of SPADs in the first pixel 171. The first diffuser can similarly diverge the cylindrical column of light rays passed from the first lens 151 through the optical filter 160 to a width of approximately 6.4 µm centered horizontally across the row of SPADs in the first pixel 171. Other diffusers 180 in the system can similarly diverge (or converge) collimated light passed by corresponding lenses across corresponding pixels in the set of pixels 170. Therefore, in this example, by connecting each SPAD (or each pixel) to a remote analog front-end processing electronics/digital processing electronics circuit 240 and by incorporating diffusers 180 that spread light passed by the optical filter 160 across the breadths and heights of corresponding pixels, the system can achieve a relatively high sensing area fill factor across the imaging sensor.

Therefore, in the one-dimensional optical system 100, pixels in the set of pixels 170 can include an array of multiple SPADS arranged in aspect ratio exceeding 1:1, and the diffuser 180 can spread light rays across corresponding non-square pixels that enables a relatively large numbers of SPADs to be tiled across a single pixel to achieve a greater dynamic range across the image sensor than an image sensor with a single SPAD per pixel, as shown in FIG. 3. In particular, by incorporating multiple SPADs per pixel (i.e., per sense channel), a first sense channel in the system can detect multiple incident photons—originating from a surface in the field bound by a field of view defined by the first aperture 141—within the span of the dead time characteristic of the SPADs. The first sense channel can therefore detect a "brighter" surface in its field of view. Additionally or alternatively, the first pixel 171 in the first sense channel can be sampled faster than the dead time characteristic of SPADs in the first pixel 171 because, though a first subset of SPADs in the first pixel 171 may be down (or "dead") during a first sampling period due to collection of incident photons during the first sampling period, other SPADs in the first pixel 171 remain on (or "alive") and can therefore collect incident photons during a subsequent sampling period. Furthermore, by incorporating pixels characterized by relatively high aspect ratios of photodetectors, the image sensor can include pixels offset by a relatively small pixel pitch, but the system 100 can still achieve a relatively high dynamic range pixel.

However, pixels in the set of pixels 170 can include any other number of SPADs arranged in any other arrays, such as in a 64-by-1 grid array (as described above), in a 32-by-2 grid array, or in a 16-by-4 grid array, and the diffuser 180 can converge and/or diverge collimated light rays onto corresponding pixels accordingly in any other suitable way. Furthermore, rather than (or in addition to) SPADs, each pixel in the set of pixels 170 can include one or more linear avalanche photodiodes, Geiger mode avalanche photodiodes, photomultipliers, resonant cavity photodiodes, QUANTUM DOT detectors, or other types of photodetectors arranged as described above, and the diffuser(s) 180 can similarly converge and diverge signals passed by the optical filter(s) 160 across corresponding pixels, as described herein.

1.7 Illumination Sources

The system includes a set of illumination sources 110 arranged along a first axis, each illumination source in the set of illumination sources 110 configured to output an illuminating beam of an operating wavelength toward a discrete spot in a field ahead of the illumination source. Generally, each illumination source functions to output an illuminating beam coincident a field of view defined by a corresponding aperture in the set of apertures 144, as shown in FIGS. 1 and 2.

In one implementation, the set of illumination sources 110 includes a bulk transmitter optic and one discrete emitter per sense channel. For example, the set of illumination sources 110 can include a monolithic VCSEL arrays including a set of discrete emitters. In this implementation, the bulk transmitter optic can be substantially identical to the bulk imaging optic 130 in material, geometry (e.g., focal length), thermal isolation, etc., and the bulk transmitter optic is adjacent and offset laterally and/or vertically from the bulk imaging optic 130. In a first example, set of illumination sources 110 includes a laser array including discrete emitters arranged in a column with adjacent emitters offset by an emitter pitch distance substantially identical to the aperture pitch distance. In this first example, each emitter outputs an illuminating beam of diameter substantially identical to or slightly greater than the diameter of a corresponding aperture in the apertures layer, and the column of emitters is arranged along the focal plane of the bulk transmitter optic such that each illuminating beam projected from the bulk transmitter optic into the field intersects and is of substantially the same size and geometry as the field of view of the corresponding sense channel, as shown in FIG. 4. Therefore, substantially all power output by each emitter in the set of illumination sources 110 can be projected into the field of view of its corresponding sense channel with relatively minimal power wasted illuminating surfaces in the field outside of the fields of view of the sense channels.

In a second example, the discrete emitters are similarly arranged in a column with adjacent emitters offset by an emitter pitch distance twice the aperture pitch distance, as shown in FIG. 2. In this second example, each emitter is characterized by an illuminating active area (or aperture) of diameter approximately (or slightly greater than) twice the diameter of a corresponding aperture in the apertures layer, and the column of emitters is offset behind the bulk transmitter optic by twice the focal length of the bulk transmitter optic such that each illuminating beam projected from the bulk transmitter optic into the field intersects and is of substantially the same size and geometry as the field of view of the corresponding sense channel, as described above. Furthermore, for the same illumination beam power density, an illuminating beam output by an emitter in this second example may contain four times the power of an illuminating beam output by an emitter in the first example described above. The system can therefore include a set of emitter arranged according to an emitter pitch distance, configured to output illuminating beams of diameter, and offset behind the bulk transmitter optic by an offset distance as a function of a scale factor (e.g., 2.0 or 3.0) and 1) the aperture pitch distance in the aperture layer, 2) the diameter of apertures in the aperture layer, and 3) the focal length of bulk transmitter optic, respectively. The system can therefore include an illuminating subsystem that is proportionally larger than a corresponding receiver subsystem to achieve greater total output illumination power within the same beam angles and fields of view of corresponding channels in the receiver subsystem.

The system can also include multiple discrete sets of illumination sources, each set of illumination sources 110 paired with a discrete bulk transmitter optic adjacent the bulk imaging optic 130. For example, the system can include a first bulk transmitter optic, a second bulk transmitter optic, and a third bulk transmitter optic patterned radially about the bulk imaging optic 130 at a uniform radial distance from the center of the bulk imaging optic 130 and spaced apart by an angular distance of 120°. In this example, the system can include a laser array with one emitter—as described above—behind each of the first, second, and third bulk transmitter optics. Each discrete laser array and its corresponding bulk transmitter optic can thus project a set of illuminating beams into the fields of view of defined by corresponding in the apertures in the aperture layer. Therefore, in this example, the three discrete laser arrays and the three corresponding bulk transmitter optics can cooperate to project three times the power onto the fields of view of the sense channels in the system, as compared to a single laser array and one bulk transmitter optic. Additionally or alternatively, the system can include multiple discrete layer arrays and bulk transmitter optics to both: 1) achieve a target illumination power output into the field of view of each sensing channel in the receiver subsystem with multiple lower-power emitters per sensing channel; and 2) distribute optical energy over a larger area in the near-field to achieve an optical energy density less than a threshold allowable optical energy density for the human eye.

However, the system can include any other number and configuration of illumination source sets and bulk transmitter optics configured to illuminate fields of view defined by the sense channels. The set of illumination sources 110 can also include any other suitable type of optical transmitter, such as a 1×16 optical splitter powered by a single laser diode, a side-emitting laser diode array, an LED array, or a quantum dot LED array, etc.

1.8 Fabrication

In one implementation, the bulk receiver lens, the aperture layer, the set of lenses 150, the optical filter 160, and the diffuser 180 are fabricated and then aligned with and mounted onto an image sensor. For example, the optical filter 160 can be fabricated by coating a fused silica substrate. Photoactive optical polymer can then be deposited over the optical filter 160, and a lens mold can be placed over the photoactive optical polymer and a UV light source activated to cure the photoactive optical polymer in the form of lenses patterned across the optical filter 160. Standoffs can be similarly molded or formed across the optical filter 160 via photolithography techniques, and an aperture layer defined by a selectively-cured, metallized glass wafer can then be bonded or otherwise mounted to the standoffs to form the aperture layer. The assembly can then be inverted, and a set of discrete diffusers and standoffs can be similarly fabricated across the opposite side of the optical filter 160. A discrete image sensor can then be aligned with and bonded to the standoffs, and a bulk imaging optic 130 can be similarly mounted over the aperture layer.

Alternatively, photolithography and wafer level bonding techniques can be implemented to fabricate the bulk imaging optics, the aperture layer, the set of lenses 150, the optical filter 160, and the diffuser 180 directly on to the un-diced semiconductor wafer containing the detector chips in order to simplify manufacturing, reduce cost, and reduce optical stack height for decreased pixel crosstalk.

2. One-Dimensional Optical System: Lens Tube

One variation of the system includes: a set of illumination sources 110 arranged along a first axis, each illumination source in the set of illumination sources 110 configured to output an illuminating beam of an operating wavelength toward a discrete spot in a field ahead of the illumination source; a bulk imaging optic 130 characterized by a focal plane opposite the field; a set of lens tubes 210 arranged in a line array parallel to the first axis, each lens tube in the set of lens tubes 210 including: a lens characterized by a focal length, offset from the focal plane by the focal length, and configured to collimate light rays reflected into the bulk imaging optic 130 from a discrete spot in the field illuminated by a corresponding illumination source in the set of optics into the bulk imaging optic 130; and a cylindrical wall 218 extending from the lens opposite the focal plane, defining a long axis substantially perpendicular to the first axis, and configured to absorb incident light rays reflected into the bulk imaging optic 130 from a region in the field outside the discrete spot illuminated by the corresponding illumination source. In this variation, the system also includes: an optical filter 160 adjacent the set of lens tubes 210 opposite the focal plane and configured to pass light rays at the operating wavelength; a set of pixels 170 adjacent the optical filter 160 opposite the set of lenses 150, each pixel in the set of pixels 170 corresponding to a lens in the set of lenses 150 and including a set of subpixels aligned along a third axis perpendicular to the first axis; and a diffuser 180 interposed between the optical filter 160 and the set of pixels 170 and configured to spread collimated light output from each lens in the set of lenses 150 across a set of subpixels of a corresponding pixel in the set of pixels 170.

Figure 7:
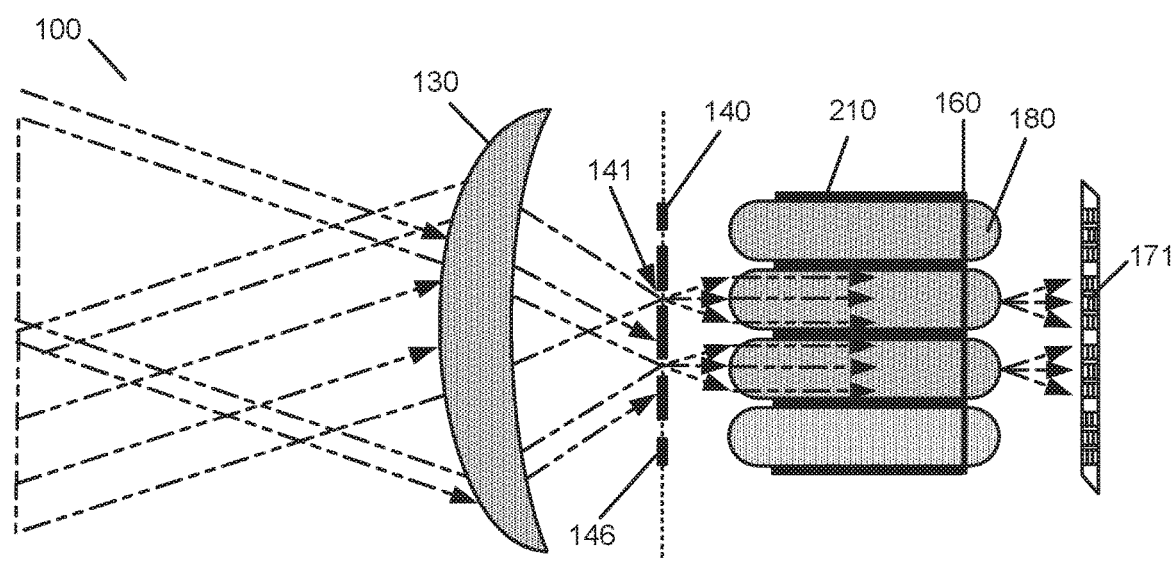
FIG. 7 is a schematic representation in accordance with one variation of the system.

Generally, in this variation, the system includes a lens tube in replacement of (or in addition to) each aperture and lens pair described above. In this variation, each lens tube can be characterized by a second (short) focal length and can be offset from the focal plane of the bulk imaging optic 130 by the second focal length to preserve the aperture of the bulk imaging optic 130 and to collimate incident light received from the bulk imaging optic 130, as described above and as shown in FIGS. 5 and 7.

Each lens tube also defines an opaque cylindrical wall 218 defining an axis normal to the incidence plane of the adjacent optical filter 160 and configured to absorb incident light rays, as shown in FIG. 5. Generally, at greater axial lengths, the cylindrical wall 218 of a lens tube may absorb light rays passing through the lens tube at shallower angles to the axis of the lens tube, thereby reducing the field of view of the lens tube (which may be similar to decreasing the diameter of an aperture in the aperture layer up to the diffraction-limited diameter, as described above) and yielding an output signal of collimated light rays nearer to perpendicular to the incidence plane of the optical filter 160. Each lens tube can therefore define an elongated cylindrical wall 218 of length sufficient to achieve a target field of view and to pass collimated light rays at maximum angles to the axis of the lens tube less than a threshold angle. In this variation, a lens tube can thus function as an aperture-sense pair described above to define a narrow field of view and to output substantially collimated light to the adjacent optical filter 160.

The cylindrical wall 218 of a lens tube can define a coarse or patterned opaque interface about a transparent (or translucent) lens material, as shown in FIG. 5, to increase absorption and decrease reflection of light rays incident on the cylindrical wall 218. Each lens tube (and each lens described above) can also be coated with an anti-reflective coating.

Figure 9:
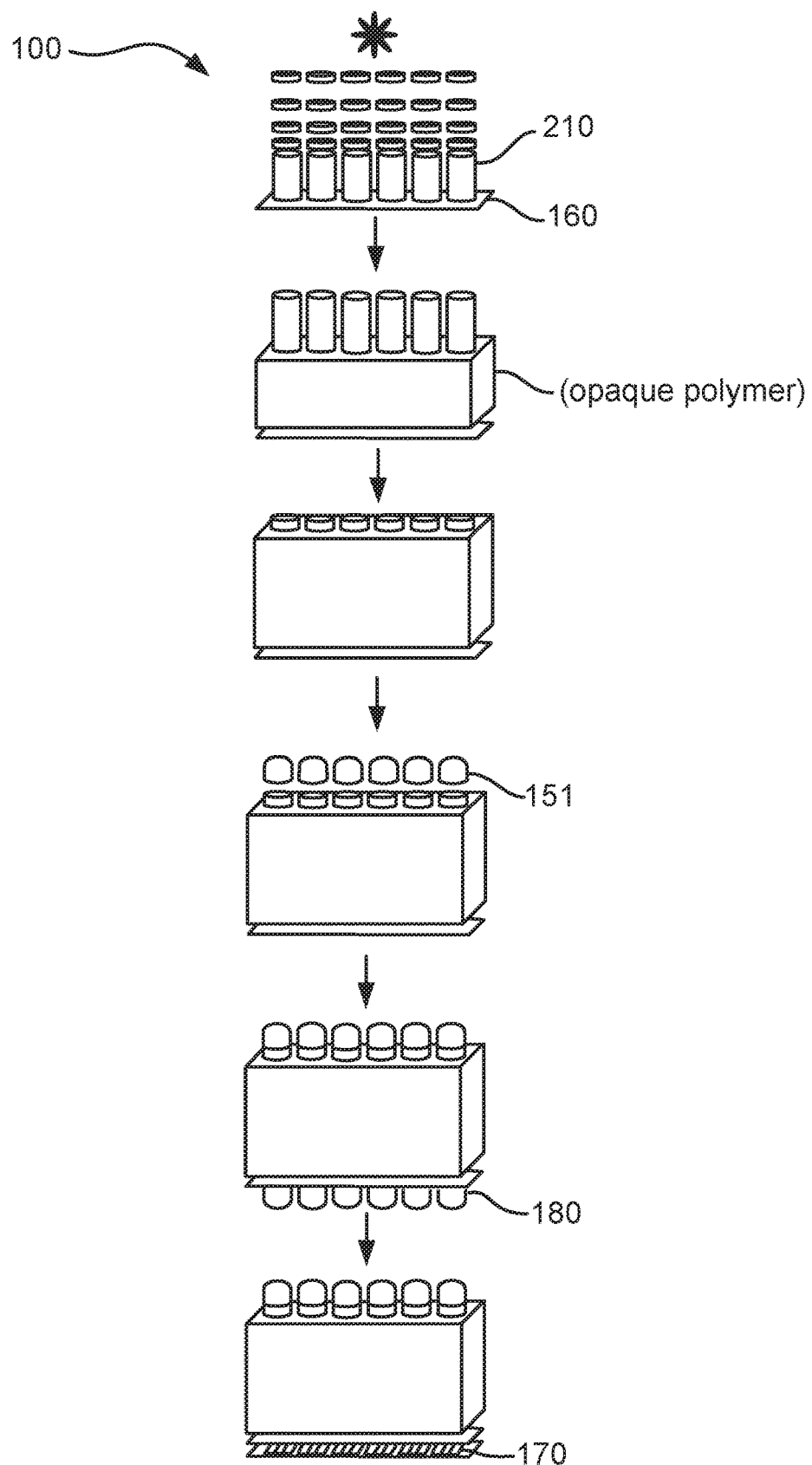
FIG. 9 is a flowchart representation in accordance with one variation of the system.
Figure 10:
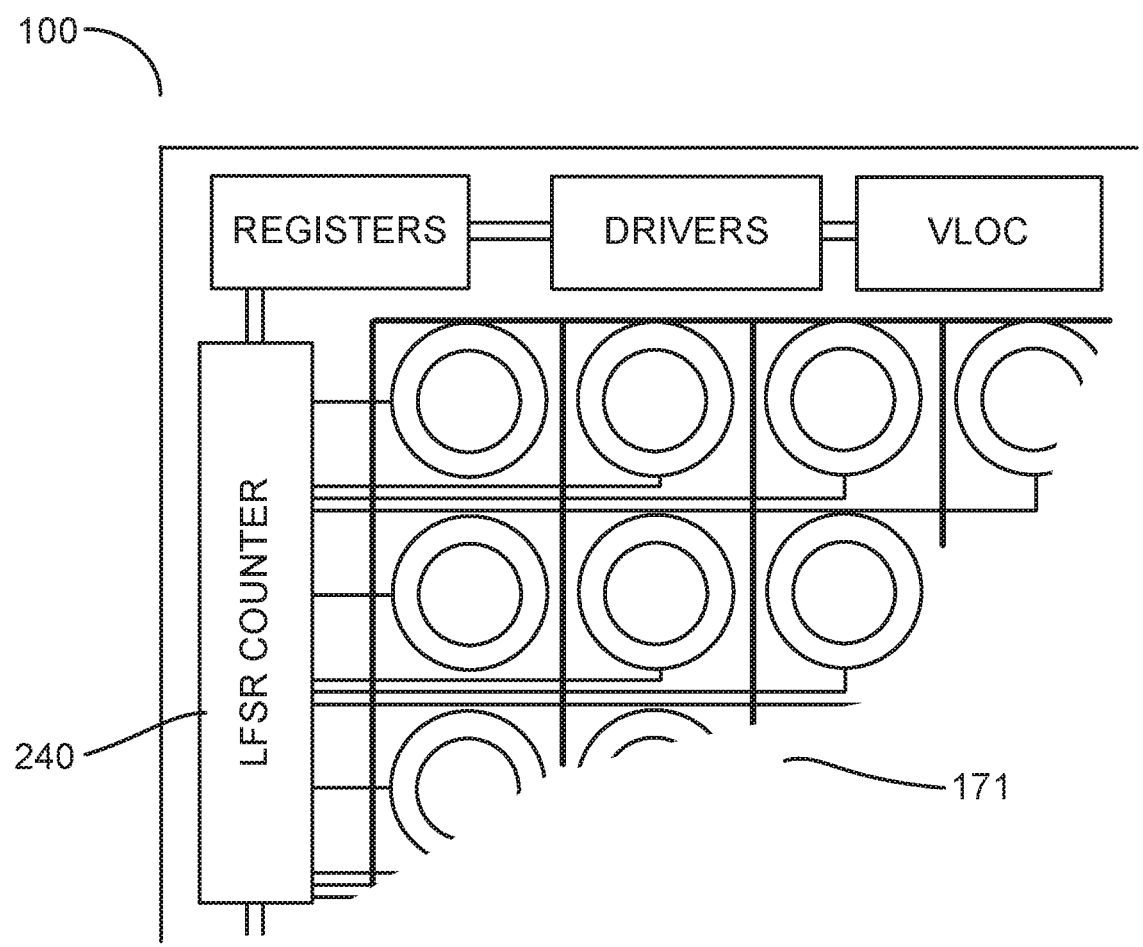
FIG. 10 is a schematic representation in accordance with one variation of the system.

As shown in FIG. 9, in this variation, the set of lens tubes 210 can be fabricated by implementing photolithography techniques to pattern a photoactive optical polymer (e.g., SU8) onto the optical filter 160 (e.g., on a silicon wafer defining the optical filter). A light-absorbing polymer can then be poured between the lens tubes and cured. A set of lenses 150 can then be fabricated (e.g., molded) separately and then bonded over the lens tubes. Alternatively, lenses can be fabricated directly onto the lens tubes by photolithography techniques. Yet alternatively, a mold for lenses can be cast directly onto the lens tubes by injecting polymer into a mold arranged over the lens tubes. A singular diffuser 180 or multiple discrete diffusers 180 can be similarly fabricated and/or assembled on the optical filter 160 opposite the lens tubes. Standoffs extending from the optical filter 160 can be similarly fabricated or installed around the diffuser(s) 180, and the image sensor can be aligned with and bonded to the standoffs opposite the optical filter 160. Other optical elements within the system (e.g., the bulk imaging lens, the bulk transmitting lens, etc.) can be fabricated according to similar techniques and with similar materials.

3. Two-Dimensional Optical System

Another variation of the system includes: a set of illumination sources 110 arranged in a first rectilinear grid array, each illumination source in the set of illumination sources 110 configured to output an illuminating beam of an operating wavelength toward a discrete spot in a field ahead of the illumination source; a bulk imaging optic 130 characterized by a focal plane opposite the field; an aperture layer coincident the focal plane, defining a set of apertures 144 in a second rectilinear grid array proportional to the first rectilinear grid array, and defining a stop region 146 around the set of apertures 144, each aperture in the set of apertures 144 defining a field of view in the field coincident a discrete spot output by a corresponding illumination source in the set of illumination sources 110, the stop region 146 absorbing light rays reflected from surfaces in the field outside of fields of view defined by the set of apertures 144 and passing through the bulk imaging optic 130; a set of lenses 150, each lens in the set of lenses 150 characterized by a second focal length, offset from the focal plane opposite the bulk imaging optic 130 by the second focal length, aligned with an aperture in the set of apertures 144, and configured to collimate light rays passed by the aperture; an optical filter 160 adjacent the set of lenses 150 opposite the aperture layer and configured to pass light rays at the operating wavelength; a set of pixels 170 adjacent the optical filter 160 opposite the set of lenses 150, each pixel in the set of pixels 170 aligned with a subset of lenses in the set of lenses 150; and a diffuser 180 interposed between the optical filter 160 and the set of pixels 170 and configured to spread collimated light output from each lens in the set of lenses 150 across a corresponding pixel in the set of pixels 170.

Generally, in this variation, the system includes a two-dimensional grid array of channels (i.e., aperture, lens, and pixel sets or lens tube and pixel sets) and is configured to image a volume occupied by the system in two dimensions. The system can collect one-dimensional distance data—such as counts of incident photons within a sampling period and/or times between consecutive photons incident on pixels of known position corresponding to known fields of view in the field—across a two-dimensional field. The one-dimensional distance data can then be merged with known positions of the fields of view for each channel in the system to reconstruct a virtual three-dimensional representation of the field ahead of the system.

In this variation, the aperture layer can define a grid array of apertures, the set of lenses 150 can be arranged in a similar grid array with one lens aligned with one aperture in the aperture layer, and the set of pixels 170 can include one pixel per aperture and lens pair, as described above. For example, the aperture layer can define a 24-by-24 grid array of 200-µm-diameter apertures offset vertically and laterally by an aperture pitch distance of 300 µm, and the set of lenses 150 can similarly define a 24-by-24 grid array of lenses offset vertically and laterally by a lens pitch distance of 300 µm. In this example, the set of pixels 170 can include a 24-by-24 grid array of 300-µm-square pixels, wherein each pixel includes a 3×3 square array of nine 100-µm-square SPADs.

Figure 8:
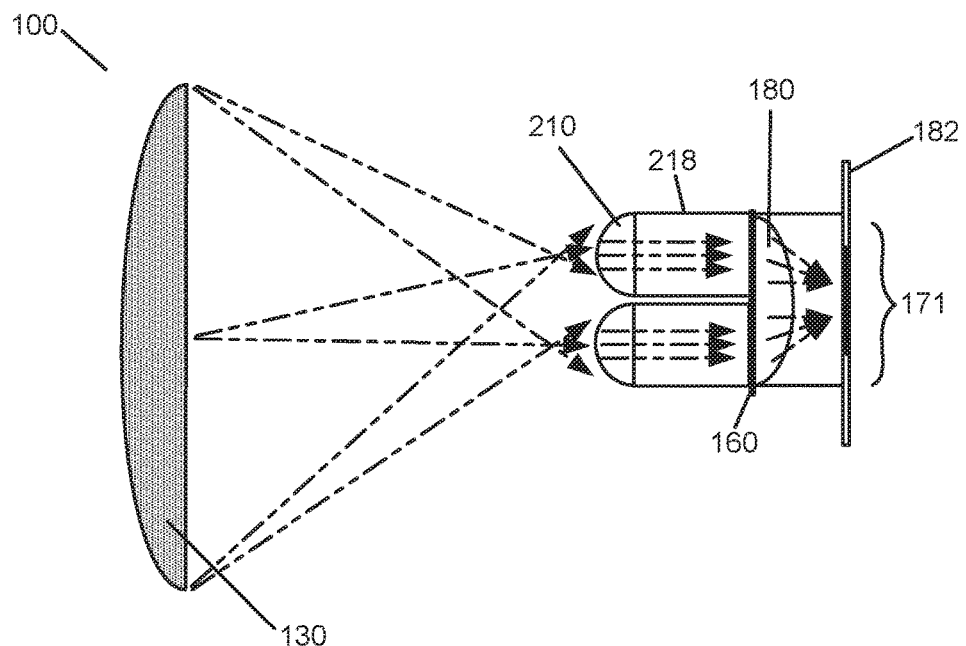
FIG. 8 is a schematic representation in accordance with one variation of the system.

Alternatively, in this variation, the set of pixels 170 can include one pixel per group of multiple aperture and lens pairs. In the foregoing example, the set of pixels 170 can alternatively include a 12-by-12 grid array of 600-μm-square pixels, wherein each pixel includes a 6×6 square array of 36 100-μm-square SPADs and wherein each pixel is aligned with a group of four adjacent lenses in a square grid. In this example, for each group of four adjacent lenses, the diffuser 180: can bias collimated light rays output from a lens in the (1,1) position in the square grid upward and to the right to spread light rays passing through the (1,1) lens across the full breadth and width of the corresponding pixel; can bias collimated light rays output from a lens in the (2,1) position in the square grid upward and to the left to spread light rays passing through the (2,1) lens across the full breadth and width of the corresponding pixel; can bias collimated light rays output from a lens in the (1,2) position in the square grid downward and to the right to spread light rays passing through the (1,2) lens across the full breadth and width of the corresponding pixel; and can bias collimated light rays output from a lens in the (2,2) position in the square grid downward and to the left to spread light rays passing through the (2,2) lens across the full breadth and width of the corresponding pixel, as shown in FIG. 8.

In the foregoing example, for each group of four illumination sources in a square grid and corresponding to one group of four lenses in a square grid, the system can actuate one illumination source in the group of four illumination sources at any given instance in time. In particular, for each group of four illumination sources in a square grid corresponding to one pixel in the set of pixels 170, the system can actuate a first illumination source 111 in a (1,1) position during a first sampling period to illuminate a field of view defined by a first aperture 141 corresponding to a lens in the (1,1) position in the corresponding group of four lenses, and the system can sample all 36 SPADs in the corresponding pixel during the first sampling period. The system can then shut down the first illumination source 111 and actuate a second illumination source 112 in a (1,2) position during a subsequent second sampling period to illuminate a field of view defined by a second aperture 142 corresponding to a lens in the (1,2) position in the corresponding group of four lenses, and the system can sample all 36 SPADs in the corresponding pixel during the second sampling period. Subsequently, the system can then shut down the first and second illumination sources 112 and actuate a third illumination source in a (2,1) position during a subsequent third sampling period to illuminate a field of view defined by a third aperture corresponding to a lens in the (2,1) position in the corresponding group of four lenses, and the system can sample all 36 SPADs in the corresponding pixel during the third sampling period. Finally, the system can shut down the first, second, and third illumination sources and actuate a fourth illumination source in a (2,2) position during a fourth sampling period to illuminate a field of view defined by a fourth aperture corresponding to a lens in the (2,2) position in the corresponding group of four lenses, and the system can sample all 36 SPADs in the corresponding pixel during the fourth sampling period. The system can repeat this process throughout its operation.

Therefore, in the foregoing example, the system can include a set of pixels 170 arranged across an image sensor 7.2 mm in width and 7.2 mm in length and can implement a scanning schema such that each channel in the system can access (can project light rays onto) a number of SPADs otherwise necessitating a substantially larger image sensor (e.g., a 14.4 mm by 14.4 mm image sensor). In particular, the system can implement a serial scanning schema per group of illumination sources to achieve an exponential increase in the dynamic range of each channel in the system. In particular, in this variation, the system can implement the foregoing imaging techniques to increase imaging resolution of the system.

In the foregoing implementation, the system can also include a shutter 182 between each channel and the image sensor, and the system can selectively open and close each shutter 182 when the illumination source for the corresponding channel is actuated and deactivated, respectively. For example, the system can include one independently-operable electrochromic shutter 182 interposed between each lens, and the system can open the electrochromic shutter 182 over the (1,1) lens in the square-gridded group of four lenses and close electrochromic shutters 182 over the (1,2), (2,1), and (2,2) lens when the (1,1) illumination source is activated, thereby rejecting noise passing through the (1,2), (2,1), and (2,2) lens from reaching the corresponding pixel on the image sensor. The system can therefore selectively open and close shutters 182 between each channel and the image sensor to increase SNR per channel during operation. Alternatively, the system can include one independently-operable electrochromic shutter 182 arranged over select regions of each pixel, as shown in FIG. 8, wherein each electrochromic shutter 182 is aligned with a single channel (i.e., with a single lens in the set of lenses). The system can alternatively include MEMS mechanical shutters or any other suitable type of shutter interposed between the set of lenses 150 and the image sensor.

In this variation, the system can define two-dimension grid arrays of apertures, lenses, diffusers, and/or pixels characterized by a first pitch distance along a first (e.g., X) axis and a second pitch distance—different from the first pitch distance—along a second (e.g., Y) axis. For example, the image sensor can include pixels offset by a 25 μm horizontal pitch and a 300 μm vertical pitch, wherein each pixel includes a single row of twelve subpixels.

However, in this variation, the two-dimensional optical system can include an array of any other number and pattern of channels (e.g., apertures, lenses (or lens tubes), and diffusers) and pixels and can execute any other suitable scanning schema to achieve higher spatial resolutions per channel than the raw pixel resolution of the image sensor. The system can additionally or alternatively include a converging optic, a diverging optic, and/or any other suitable type of optical element to spread light rights passed from a channel across the breadth of a corresponding pixel.

As a person skilled in the art will recognize from the previous detailed description and from the figures and claims, modifications and changes can be made to the embodiments of the invention without departing from the scope of this invention as defined in the following claims.

What is claimed is:

1. An optical imaging system comprising:
a bulk imaging optic having a focal plane;
an array of pixels; and
an aperture layer disposed between the bulk imaging optic and the array of pixels, the aperture layer including a plurality of discrete apertures coincident with the focal plane, wherein the aperture layer and pixel layer are arranged to form a plurality of sense channels defining a plurality of discrete, non-overlapping fields of view beyond a threshold distance in a field external to the optical imaging system, each sense channel in the plurality of sense channels including a pixel from the array of pixels and an aperture from the plurality of apertures that defines the field of view for its respective pixel, and wherein a pixel area of each pixel in the plurality of sense channels is larger than an area of its corresponding aperture in the plurality of apertures.

2. The optical imaging system of claim 1 wherein each pixel in the array of pixels comprises a plurality of subpixels distributed across its pixel area.

3. The optical imaging system of claim 2 wherein the plurality of subpixels in each pixel is a plurality of SPADs.

4. The optical imaging system of claim 1 further comprising, within each channel in the plurality of sense channels, an optical filter disposed between the bulk imaging optic and the array of pixels, the optical filter configured to receive light passed through the bulk imaging optic and pass a narrow band of radiation while blocking radiation outside the band.

5. The optical imaging system of claim 1 further comprising:
a bulk transmitter optic; and
an illumination source comprising a plurality of emitters corresponding in number to the plurality of sense channels, each emitter in the plurality of emitters configured to project an illuminating beam at an operating wavelength through the bulk transmitter optic into a field of view that is substantially the same size and geometry as a field of view defined by the bulk imaging optic and a corresponding aperture in the plurality of sense channels.

6. The optical imaging system of claim 5 wherein each emitter in the plurality of emitters comprises a vertical-cavity surface-emitting laser (VCSEL).

7. The optical imaging system of claim 5 wherein a diameter of each illuminating beam projected from each emitter in the illumination source is substantially similar to a cross-section to a field of view of its respective sense channel at various distances from the optical imaging system.

8. The optical imaging system of claim 6 further comprising, within each channel in the plurality of sense channels, an optical filter disposed between the bulk imaging optic and the array of pixels, the optical filter configured to receive light passed through the bulk imaging optic and pass a narrow band of radiation that includes the operating wavelength of the plurality of lasers to the plurality of pixels while blocking radiation outside the band.

9. The optical imaging system of claim 8 further comprising, within each channel in the plurality of sense channels, a diffuser disposed within the channel between the aperture and the pixel.

10. The optical imaging system of claim 5 wherein each emitter in the plurality of emitters comprises a vertical-cavity surface-emitting laser VCSEL), each pixel in the array of pixels comprises a plurality of SPADs and an optical filter is disposed between the bulk imaging optic and the array of pixels, the optical filter configured to receive light passed through the bulk imaging optic and pass a narrow band of radiation that includes the operating wavelength of the plurality of VCSELs to the array of pixels while blocking radiation outside the band.

11. The optical imaging system of claim 1 further comprising a plurality of lenses, wherein each channel in the plurality of channels includes a lens from the plurality of lenses disposed between the aperture of the channel and its corresponding pixel.

12. The optical imaging system of claim 1 wherein adjacent apertures in the aperture layer are offset by an aperture pitch distance greater than a diameter of each aperture.

13. An optical imaging system comprising:
a bulk imaging optic having a focal plane;
an array of pixels of substantially uniform pixel area, each pixel in the array of pixels including a plurality of subpixels distributed across its pixel area; and
an aperture layer disposed between the bulk imaging optic and the array of pixels, the aperture layer including a plurality of discrete apertures of substantially uniform area formed coincident with the focal plane and stop regions interposed between adjacent apertures in the aperture layer, wherein the aperture layer and pixel layer are arranged to form a plurality of sense channels defining a plurality of discrete, non-overlapping fields of view beyond a threshold distance in a field external to the optical imaging system, each sense channel in the plurality of sense channels including an aperture from the plurality of apertures and a pixel from the array of pixels with the aperture of each channel defining the field of view for its respective pixel, and wherein an area of the aperture in each channel is smaller than a pixel area of its respective pixel.

14. The optical imaging system of claim 13 wherein the plurality of subpixels in each pixel is a plurality of SPADs.

15. The optical imaging system of claim 13 further comprising:
a bulk transmitter optic; and
an illumination source comprising a plurality of lasers corresponding in number to the plurality of sense channels, each laser in the plurality of lasers configured to project a discrete illuminating beam at an operating wavelength through the bulk transmitter optic into a field of view that is substantially the same size and geometry as a field of view defined by the bulk imaging optic and a corresponding aperture in the plurality of sense channels.

16. The optical imaging system of claim 15 wherein each aperture in the plurality of discrete apertures defines a field of view in the field coincident a discrete spot output by a corresponding laser in the plurality of lasers.

17. An optical imaging system comprising:
a bulk receiver imaging optic having a focal plane;
an optical assembly having a plurality of sense channels defining a plurality of discrete, non-overlapping fields of view beyond a threshold distance in a field external to the bulk imaging optic, the optical assembly comprising:
an array of pixels of substantially uniform pixel area, each pixel in the array of pixels including a plurality of subpixels distributed across its pixel area;
an aperture layer disposed between the bulk receiver optic and the array of pixels, the aperture layer including a plurality of discrete apertures of substantially uniform area formed coincident with the focal plane and stop regions between adjacent apertures;
a lens layer including a plurality of lenses arranged to receive light passed through the aperture and pass the received light towards the array of pixels; and
an optical filter layer disposed between the bulk imaging optic and the array of pixels, the optical filter layer configured to receive light passed through the bulk imaging optic and pass a narrow band of radiation while blocking radiation outside that band;

wherein each sense channel in the optical assembly includes a pixel from the array of pixels, an aperture from the aperture layer that defines the field of view for its respective pixel and has an area that is smaller than a sensing area of its respective pixel, a lens from the lens layer and a filter from the optical filter layer.

18. The optical imaging system of claim 17 wherein adjacent apertures in the aperture layer are offset by an aperture pitch distance greater than a diameter of each aperture and substantially equal to a pitch between adjacent lenses in the lens layer.

19. The optical imaging system of claim 18 wherein the optical filter layer is disposed between the lens layer and the array of pixels and wherein each lens is configured to collimate light rays passed by its respective aperture so that light rays incident on the optical filter meet the optical filter at an angle of incidence of approximately 0 degrees.

20. The optical imaging system of claim 18 further comprising:
a bulk transmitter optic; and
an illumination source comprising a plurality of emitters corresponding in number to the plurality of sense channels, each emitter in the plurality of emitters configured to project an illuminating beam at an operating wavelength through the bulk transmitter optic into a field of view that overlaps with a field of view defined by the bulk imaging optic and a corresponding aperture in the plurality of sense channels.

21. The optical imaging system of claim 20 wherein the plurality of subpixels in each pixel is a plurality of SPADs and where the plurality of emitters in the illumination source is a plurality of vertical-cavity surface-emitting lasers (VCSELs).

22. The optical imaging system of claim 21 wherein each aperture in the plurality of discrete apertures has a diameter of 200 microns or less.

23. The optical imaging system of claim 21 wherein each aperture in the plurality of discrete apertures has a diameter approaching the diffraction-limited diameter for the plurality of VCSELs.

24. The optical imaging system of claim 21 wherein each aperture in the plurality of discrete apertures has a diameter less than the diffraction-limited diameter for the operating wavelength of the plurality of emitters.

25. The optical imaging system of claim 21 wherein each aperture in the plurality of discrete apertures has a diameter matched to a dynamic range of its corresponding pixel.

26. The optical imaging system of claim 21 wherein the stop region surrounding each aperture in the plurality of discrete apertures blocks light rays reflected from a region of the surface outside the field of view of its corresponding aperture.

27. An optical imaging system comprising:
a bulk imaging optic having a focal plane;
a plurality of pixels arranged in a pixel array in which adjacent pixels in the array are spaced apart from each other in a first dimension by a pixel pitch; and
an aperture layer disposed between the bulk imaging optic and the plurality of pixels arranged in the pixel array, the aperture layer including a plurality of discrete apertures of substantially uniform size coincident with the focal plane and stop regions between adjacent apertures, wherein the plurality of discrete apertures are arranged in an aperture array in which adjacent apertures in the aperture array are spaced apart from each other in the first dimension by an aperture pitch and wherein the aperture array is aligned with the pixel array and a maximum linear dimension of each aperture in the aperture array is less than the pixel pitch; and
wherein the aperture layer and pixel layer are arranged to form a plurality of sense channels defining a plurality of discrete, non-overlapping fields of view beyond a threshold distance in a field external to the optical imaging system, each sense channel in the plurality of sense channels including a pixel from the plurality of pixels and an aperture from the plurality of apertures that defines the field of view for its respective pixel.

28. The optical imaging system of claim 27 wherein each aperture in the plurality of discrete apertures is a circular aperture of substantially uniform diameter.

29. The optical imaging system of claim 27 wherein the aperture pitch is substantially equal to the pixel pitch.

30. The optical imaging system of claim 27 wherein each pixel in the plurality of pixels comprises a plurality of subpixels distributed across a pixel area.

31. The optical imaging system of claim 30 wherein the plurality of subpixels in each pixel is a plurality of SPADs.

32. The optical imaging system of claim 27 further comprising, within each channel in the plurality of sense channels, an optical filter disposed between the bulk imaging optic and the pixel within the channel, the optical filter configured to receive light passed through the bulk imaging optic and pass a narrow band of radiation while blocking radiation outside the band.

33. The optical imaging system of claim 32 further comprising:
a bulk transmitter optic; and
an illumination source comprising a plurality of emitters corresponding in number to the plurality of sense channels, each emitter in the plurality of emitters configured to project electromagnetic radiation at an operating wavelength through the bulk transmitter optic into a field of view that is aligned with and overlaps with a field of view defined by the bulk imaging optic and a corresponding aperture in the plurality of sense channels; and
wherein the narrow band of radiation passed by the optical filter includes the operating wavelength.

34. The optical imaging system of claim 33 wherein each emitter in the plurality of emitters comprises a laser.

35. An optical imaging system comprising:
a bulk imaging optic having a focal plane;
an array of pixels; and
an aperture layer disposed between the bulk imaging optic and the array of pixels, the aperture layer including a plurality of discrete apertures coincident with the focal plane, wherein the aperture layer and pixel layer are arranged to form a plurality of sense channels defining a plurality of discrete, non-overlapping fields of view beyond a threshold distance in a field external to the optical imaging system, each sense channel in the plurality of sense channels including a pixel from the array of pixels and an aperture from the plurality of apertures that defines the field of view for its respective pixel.

36. The optical imaging system of claim 35 further comprising a plurality of lenses disposed between the aperture layer and the array of pixels with each lens in the plurality of lenses being characterized by a second focal length, and wherein each channel in the plurality of channels includes a lens from the plurality of lenses offset from the bulk imaging optic focal plane by the second focal length and aligned with a corresponding aperture in the channel.

37. The optical system of claim 36 further comprising, within each channel in the plurality of sense channels, an optical filter disposed between the bulk imaging optic and the array of pixels, the optical filter configured to receive light passed through the bulk imaging optic and pass a narrow band of radiation to the array of pixels while blocking radiation outside the band.

38. The optical imaging system of claim 36 wherein, within each channel, the lens from the plurality of lenses is disposed between an aperture and optical filter and is configured to collimate light rays passed by the aperture and to pass the collimated light rays into the optical filter.

39. The optical imaging system of claim 35 wherein the pixel in each of the plurality of sense channels comprises a plurality of SPADs distributed across a pixel area of the pixel that is larger than an area of its corresponding aperture.

40. The optical imaging system of claim 39 further comprising, within each channel in the plurality of sense channels, a diffuser disposed within the channel between the aperture and its corresponding pixel, the diffuser configured to spread light rays passed by the aperture across the plurality of SPADs distributed across the pixel area of the pixel.

41. The optical imaging system of claim 35 wherein each pixel in the array of pixels comprises a plurality of SPADs.

42. The optical imaging system of claim 41 wherein each pixel in the array of pixels is operable to output a signal corresponding to a count of photons incident on the pixel within one sample period.

43. The optical imaging system of claim 35 further comprising:
   a bulk transmitting optic;
   a plurality of emitters, each emitter in the plurality of emitters configured to output electromagnetic radiation of an operating wavelength through the bulk transmitting optic and into a field of view in the field external to the optical imaging system coincident a field of view of a defined by a corresponding aperture in the plurality of discrete apertures.

44. An optical imaging system comprising:
   a bulk imaging optic;
   a plurality of pixels arranged behind the bulk imaging optic, wherein each pixel in the plurality of pixels comprises a plurality of single photon avalanche diodes (SPADs) and has a field of view that is non-overlapping beyond a threshold distance in a field external to the optical imaging system with fields of view of all other pixels in the plurality of pixels, and wherein the plurality of pixels includes at least a first pixel and a second pixel;
   an aperture layer disposed between the bulk imaging optic and the plurality of pixels, the aperture layer comprising a plurality of apertures separated from each other by a stop region, the plurality of apertures including a first aperture disposed in a first optical path extending between the bulk imaging optic and the first pixel and a second aperture disposed in a second optical path extending between the bulk imaging optic and the second pixel;
   a bulk transmitting optic disposed adjacent to the bulk imaging optic; and
   a plurality of emitters arranged to project electromagnetic radiation through the bulk transmitting optic and into the field according to an illumination pattern where electromagnetic radiation output from each emitter in the illumination pattern is coincident with a field of view of a corresponding pixel in the plurality of pixels.

45. The optical imaging system of claim 44 wherein the plurality of pixels further includes third and fourth pixels, and the plurality of apertures further includes a third aperture disposed in a third optical path extending between the bulk imaging optic and the third pixel and a fourth aperture disposed in a fourth optical path extending between the bulk imaging optic and the fourth pixel.

46. The optical imaging system of claim 44 wherein the plurality of emitters comprises a plurality of vertical-cavity surface-emitting lasers (VCSELs).

47. The optical imaging system of claim 46 wherein each emitter in the plurality of emitters comprises a single VCSEL.

48. The optical imaging system of claim 44 wherein each pixel in the plurality of pixels is operable to output a signal corresponding to a count of photons incident on the pixel within one sample period.

49. The optical imaging system of claim 44 wherein the bulk transmitting optic and the bulk imaging optic are each image-space telecentric lenses.

50. The optical imaging system of claim 44 wherein the optical imaging system is configured to collect distance data based on recorded times between transmission of beams of electromagnetic radiation emitted from the plurality of emitters and detection of photons originating from the beams of electromagnetic radiation.

* * * * *

(12) INTER PARTES REVIEW CERTIFICATE (4244th)

United States Patent
Pacala et al.

(10) Number: US 11,190,750 K1
(45) Certificate Issued: Jan. 26, 2026

(54) OPTICAL IMAGING SYSTEM WITH A PLURALITY OF SENSE CHANNELS

(71) Applicants: Angus Pacala; Mark Frichtl

(72) Inventors: Angus Pacala; Mark Frichtl

(73) Assignee: OUSTER, INC.

Trial Number:

IPR2023-01457 filed Sep. 25, 2023

Inter Partes Review Certificate for:

Patent No.: 11,190,750
Issued: Nov. 30, 2021
Appl. No.: 16/046,643
Filed: Jul. 26, 2018

The results of IPR2023-01457 are reflected in this inter partes review certificate under 35 U.S.C. 318(b).

INTER PARTES REVIEW CERTIFICATE
U.S. Patent 11,190,750 K1
Trial No. IPR2023-01457
Certificate Issued Jan. 26, 2026

AS A RESULT OF THE INTER PARTES REVIEW PROCEEDING, IT HAS BEEN DETERMINED THAT:

Claims 44-48 and 50 are cancelled.

\* \* \* \* \*